(12) United States Patent
Clarke et al.

(10) Patent No.: US 12,620,787 B2
(45) Date of Patent: May 5, 2026

(54) SYSTEM AND METHOD FOR STRINGING SPANS OF CABLE

(71) Applicant: FT HOLDINGS INC., Calgary (CA)

(72) Inventors: Jason Peter Clarke, Calgary (CA); Daniel John Clarke, Calgary (CA)

(73) Assignee: FT Holdings Inc., Calgary (CA)

( * ) Notice: Subject to any disclaimer, the term of this patent is extended or adjusted under 35 U.S.C. 154(b) by 325 days.

(21) Appl. No.: 18/383,381

(22) Filed: Oct. 24, 2023

(65) Prior Publication Data

US 2024/0266810 A1    Aug. 8, 2024

Related U.S. Application Data

(60) Provisional application No. 63/421,819, filed on Nov. 2, 2022.

(51) Int. Cl.
| | |
|---|---|
| *H02G 1/04* | (2006.01) |
| *B64D 1/22* | (2006.01) |
| *B64U 10/60* | (2023.01) |
| *B64U 101/00* | (2023.01) |

(52) U.S. Cl.
CPC ................. *H02G 1/04* (2013.01); *B64D 1/22* (2013.01); *B64U 10/60* (2023.01); *B64U 2101/00* (2023.01)

(58) Field of Classification Search
CPC ........ H02G 1/02; H02G 1/04; H02G 2200/00; B64U 10/00; B64U 10/60; B64D 1/22
See application file for complete search history.

(56) References Cited

U.S. PATENT DOCUMENTS

| | | | | |
|---|---|---|---|---|
| 10,329,016 | B1* | 6/2019 | Jackson | B65H 75/425 |
| 2012/0091259 | A1* | 4/2012 | Morris | B64C 19/00 |
| | | | | 244/17.11 |
| 2013/0233964 | A1* | 9/2013 | Woodworth | B64U 10/60 |
| | | | | 244/175 |
| 2021/0009285 | A1* | 1/2021 | Talke | B66D 1/7447 |
| 2024/0003945 | A1* | 1/2024 | Wong | G01R 31/085 |
| 2024/0266810 | A1* | 8/2024 | Clarke | B64U 10/13 |
| 2024/0332925 | A1* | 10/2024 | Van Der Berg | B66D 1/505 |
| 2025/0021111 | A1* | 1/2025 | Evans | G05D 1/104 |
| 2025/0319998 | A1* | 10/2025 | Ishikawa | G01S 17/933 |

* cited by examiner

*Primary Examiner* — Lee D Wilson
(74) *Attorney, Agent, or Firm* — Foley & Lardner LLP

(57)    ABSTRACT

Systems and methods are described for stringing spans of cable, in particular, electric power transmission lines between utility poles using a robotic device suspended from an unmanned aerial vehicle ("UAV"). In some aspects, a thrust assembly suspended by a UAV pulls the cable from pole to pole whereas in other aspects, an aerial robot integrating the functions of the thrust assembly and the UAV pulls the cable from pole to pole.

19 Claims, 21 Drawing Sheets

SYSTEM AND METHOD FOR STRINGING SPANS OF CABLE

CROSS-REFERENCE TO RELATED APPLICATIONS

This application claims priority to and the benefit of U.S. provisional patent application No. 63/421,819 filed Nov. 2, 2022, the content of which is incorporated by reference in its entirety.

TECHNICAL FIELD

The present disclosure is related to the field of stringing spans of cable, in particular, electric power transmission lines between utility poles using a robotic device suspended from an unmanned aerial vehicle ("UAV").

BACKGROUND

The stringing of electric power transmission lines can be time-consuming, labour-intensive, dangerous and expensive.

Typically, a pilot line for the transmission line is fed by a human using a helicopter or ground vehicle onto sheaves placed on a series of utility poles wherein the pilot line can be attached to a winch that can then draw the pilot line followed by the transmission line fed from a spool over the series of pole-mounted sheaves.

It is, therefore, desirable to provide a system and method that makes the process of stringing electric power transmission lines faster, safer and cheaper.

SUMMARY

Systems and methods are provided for stringing cables, such as electric power transmission lines, between utility poles using a robotic device suspended from a UAV.

For the purposes of this specification, and the claims that follow, the term "cable" shall be defined as including electric power transmission lines in addition to any other form of cable, wire, guy wire or line that can be installed as described and claimed herein.

Broadly stated, in some embodiments, a system can be provided for stringing a span of cable, the system comprising a robotic aerial assembly for pulling the cable.

Broadly stated, in some embodiments, the robotic aerial assembly can comprise: an aerial thrust assembly; and an unmanned aerial vehicle ("UAV") for suspending the aerial thrust assembly above a ground surface.

Broadly stated, in some embodiments, the aerial thrust assembly can comprise: a central frame rod having a first end and second end; at least one electric motor disposed on the first end, the at least one electric motor operatively coupled to a propeller; a quick release assembly disposed on the second end, the quick release assembly configured for releasable coupling to the cable; and a battery assembly disposed on the central frame rod, the battery assembly operatively coupled to the at least one electric motor.

Broadly stated, in some embodiments, the system can further comprise: a computer operatively coupled to the at least one electric motor, the computer operatively powered by the battery assembly; a radio modem operatively coupled to the computer, the radio modem operatively powered by the battery assembly; and at least one radio antenna operatively coupled to the radio modem.

Broadly stated, in some embodiments, the system can further comprise a ground station wireless transceiver for transmitting and receiving signals to and from the radio modem.

Broadly stated, in some embodiments, the system can further comprise an upright assembly operatively coupled to the aerial thrust assembly, the upright assembly configured for coupling to the UAV, wherein the computer, the radio modem and the at least one radio antenna are disposed on the upright assembly.

Broadly stated, in some embodiments, wherein the at least one electric motor can comprise two electric motors with propellers attached thereto, the two electric motors configured to rotate in opposite directions to each other.

Broadly stated, in some embodiments, the robotic aerial assembly can comprise: a central frame rod having a first end and second end; at least one electric motor disposed on the first end, the at least one electric motor operatively coupled to a propeller, the at least one electric motor rotatably coupled to the central frame rod; a quick release assembly disposed on the second end, the quick release assembly configured for releasable coupling to the cable; and a battery assembly disposed on the central frame rod, the battery assembly operatively coupled to the at least one electric motor.

Broadly stated, in some embodiments, the system can further comprise: a first control servo mechanism for rotating the at least one electric motor vertically up and down relative to the central frame rod; and a second control servo mechanism for rotating the at least one electric motor horizontally side-to-side relative to the central frame rod.

Broadly stated, in some embodiments, the battery assembly can comprise: a battery plate operatively coupled to the central frame rod; and one or more batteries disposed on the battery plate.

Broadly stated, in some embodiments, a method can be provided for stringing a span of cable disposed on a spool over a plurality of utility poles, each utility pole comprising a cable sheave disposed thereon, the method comprising the steps of: attaching the cable to a robotic aerial assembly; operating the robotic aerial assembly to raise the cable, thereby dispensing the cable from the spool, to bring the cable near the cable sheave of a first of the plurality of utility poles; attaching a grappling hook to a portion of the cable near the spool; and operating the robotic aerial assembly further to pull the cable onto the sheaves of one or more of the plurality of the utility poles.

Broadly stated, in some embodiments, the method can further comprise: passing the grappling hook over the sheave over a last of the plurality of the utility poles; and releasing the cable from the robotic aerial assembly whereby the grappling hook catches on the sheave of the last of the plurality of utility poles to keep the cable in place.

DETAILED DESCRIPTION OF EMBODIMENTS

Figure 1:
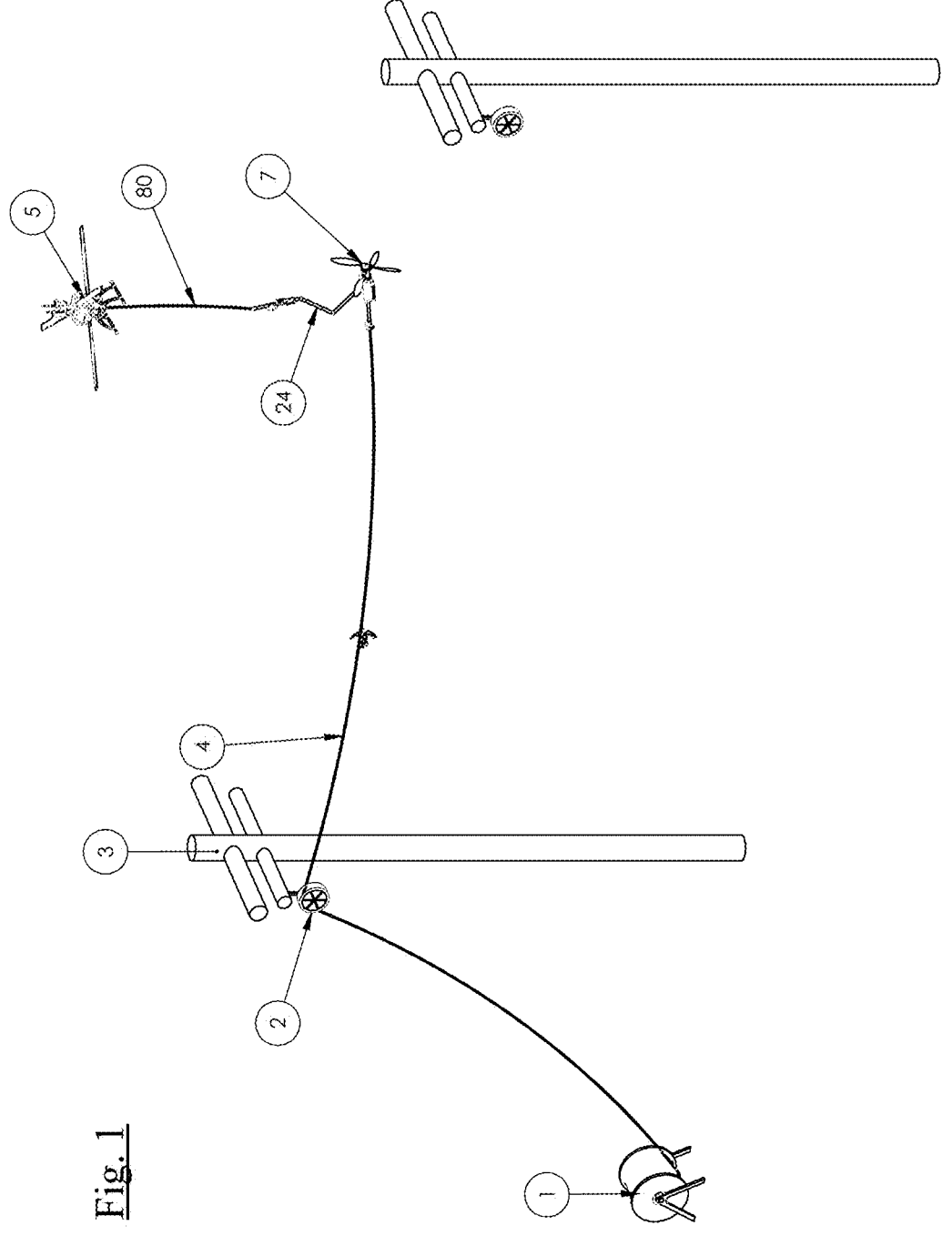
FIG. 1 is a perspective view depicting a line stringing robot suspended from an unmanned aerial vehicle installing an electric power transmission line.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

The presently disclosed subject matter is illustrated by specific but non-limiting examples throughout this description. The examples may include compilations of data that are representative of data gathered at various times during the course of development and experimentation related to the present invention(s). Each example is provided by way of explanation of the present disclosure and is not a limitation thereon. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

While the following terms used herein are believed to be well understood by one of ordinary skill in the art, definitions are set forth to facilitate explanation of the presently disclosed subject matter.

Unless defined otherwise, all technical and scientific terms used herein have the same meaning as commonly understood by one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims.

Unless otherwise indicated, all numbers expressing quantities, properties, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, the term "about", when referring to a value or to an amount of mass, weight, time, volume, concentration or percentage is meant to encompass variations of in some embodiments +/−50%, in some embodiments +/−40%, in some embodiments +/−30%, in some embodiments +/−20%, in some embodiments +/−10%, in some embodiments +/−5%, in some embodiments +/−1%, in some embodiments +/−0.5%, and in some embodiments +/−0.1% from the specified amount, as such variations are appropriate to perform the disclosed method.

Alternatively, the terms "about" or "approximately" can mean within an acceptable error range for the particular value as determined by one of ordinary skill in the art, which will depend in part on how the value is measured or determined, i.e., the limitations of the measurement system. For example, "about" can mean within 3, or more than 3, standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Unless otherwise indicated, all numbers expressing quantities, properties, and so forth used in the specification and claims are to be understood as being modified in all instances by the term "about". And so, the numerical parameters set forth in this specification and claims are approximations that can vary depending upon the desired properties sought to be obtained by the presently disclosed subject matter.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Referring to the Figures, FIG. 1 shows a perspective side view of one embodiment of a system for stringing electric power transmission lines, which can comprise of line stringing robot [7], suspended from unmanned aerial vehicle [5], that can feed pilot line [4] from spool [1] through a plurality of sheaves [2] mounted to utility poles [3]. In some embodiments, the purpose of feeding pilot line [4] is to facilitate the stringing of electric power transmission lines between utility poles [3] where it is desirable to keep the electric power transmission lines under tension to avoid contacting the ground or other hazards. Typically, the pilot line is fed by a human using a helicopter or ground vehicle. This method is time consuming, dangerous and expensive. Thus, a need for a robotic unmanned method of feeding Pilot Line [4] exists to make the process faster, safer and cheaper.

Figure 3:
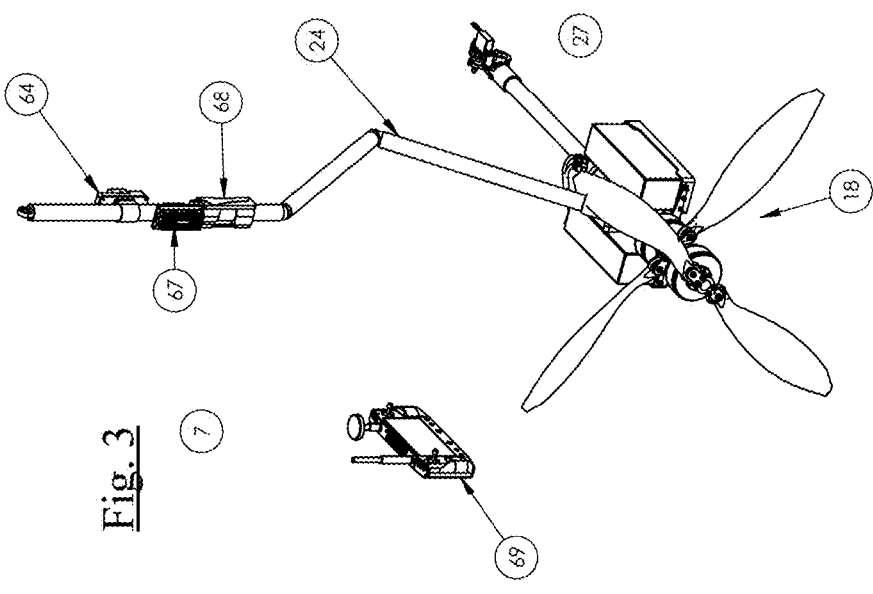
FIG. 3 is an upper perspective view depicting the line stringing robot of FIG. 2.
Figure 2:
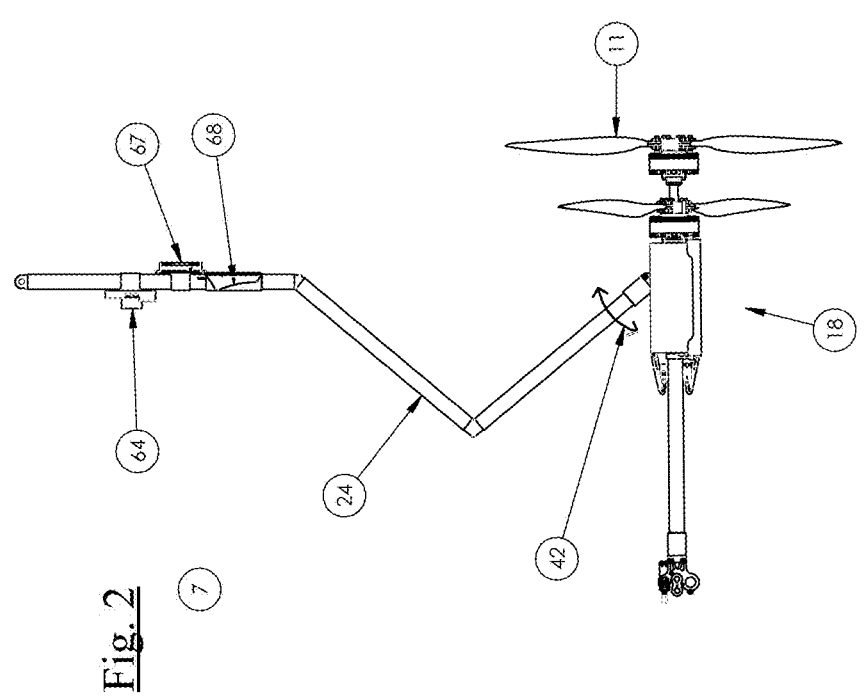
FIG. 2 is a side elevation view depicting the line stringing robot of FIG. 1.

FIG. 2 shows a side view, and FIG. 3 shows an upper perspective front view of robot [7]. In some embodiments, robot [7] can comprise of two main assemblies: thrust assembly [18] and upright assembly [24]. Thrust assembly [18] can be connected to upright assembly [24] via a clevis bracket connection secured through shoulder bolts and located at the center of mass of thrust assembly [18]. This connection can provide a singular pivot axis, allowing thrust assembly [18] to pitch about its transverse axis, movement shown by arrow [42], independently of upright assembly [24]. The pitch about the transverse axis is critical to allow robot [7] to create thrust, via a plurality of propellers [11], axially aligned with the tension vector created by feeding pilot line [4]. The thrust force from thrust assembly [18], coupled with the positioning of unmanned aerial vehicle [5], can provide the tension on pilot line [4] to feed between utility poles [3]. To operate robot [7], a human operator can use ground station [69] to send radio signals to one or more radio antennas [68] operatively coupled to radio modem [67]. Radio modem [67] can decode the radio signals from ground station [69] and sends these signals to computer [64], which in turn sends signals to the electrical equipment fitted to robot [7], for example electrically driven motors and servo actuators, to cause robot [7] to complete its task of line stringing. The computer can, in some embodiments, be programmed to operate robot [7] automatically without operator input, or semi-automatically by taking cues from the human operator via ground station [69] as desired. In some embodiments, ground station [69] can comprise a Herelink integrated remote controller, ground station and wireless digital transmission system radio transceiver manufactured by ProfiCNC of Moolap, Victoria, Australia. In some embodiments, modem [67] can comprise a Herelink air unit manufactured by ProfiCNC of Moolap, Victoria, Australia. In some embodiments, computer [64] can comprise a Cube Orange computing device manufactured by ProfiCNC of Moolap, Victoria, Australia.

Figure 4:
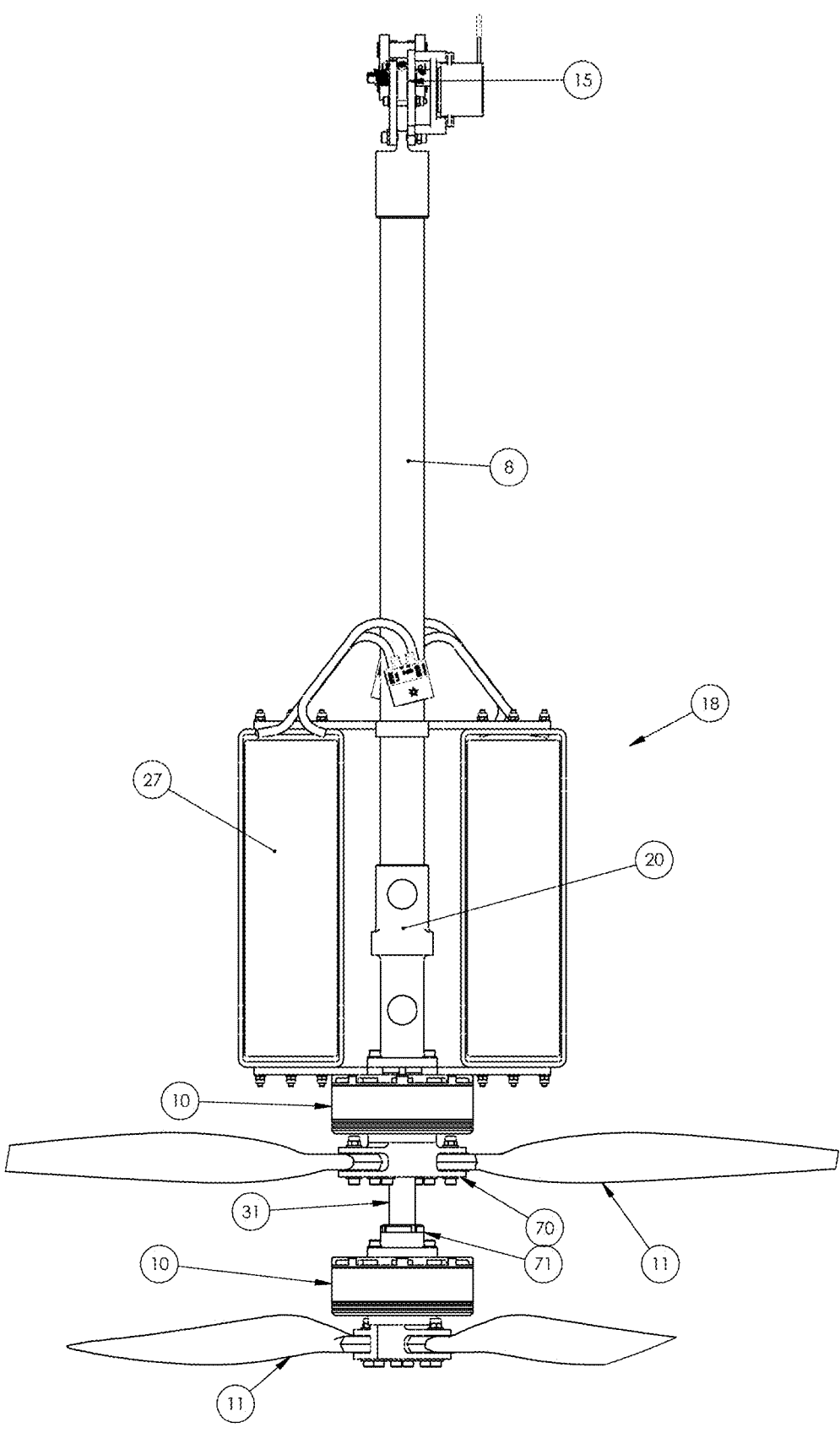
FIG. 4 is a top plan view depicting a thrust assembly of the line stringing robot of FIG. 1.

FIG. 4 shows a detailed top plan view of thrust assembly [18]. Thrust assembly [18] can comprise of quick release assembly [15], central frame rod [8], battery assembly [27], motor mount [20], propeller mount [70], motor shaft [31], secondary motor mount [71], a plurality of motors [10], and a plurality of propellers [11]. In some embodiments, quick release assembly [15] can provide the connection between pilot line [4] and robot [7], as described in greater detail below. In some embodiments, central frame rod [8] can couple quick release assembly [15] to motor mount [20], while also providing structural support to battery assembly [27]. Motor mount [20] can be bolted directly to first motor [10] and has motor shaft [31] threaded in axial alignment. Motor shaft [31] can support the second motor [10] by being threaded in axial alignment with secondary motor mount [71]. Second motor [10] can be bolted directly to secondary motor mount [71]. The plurality of propellers [11] can be mounted to the plurality of motors [10] via a plurality of propeller mounts [70].

Figure 5:
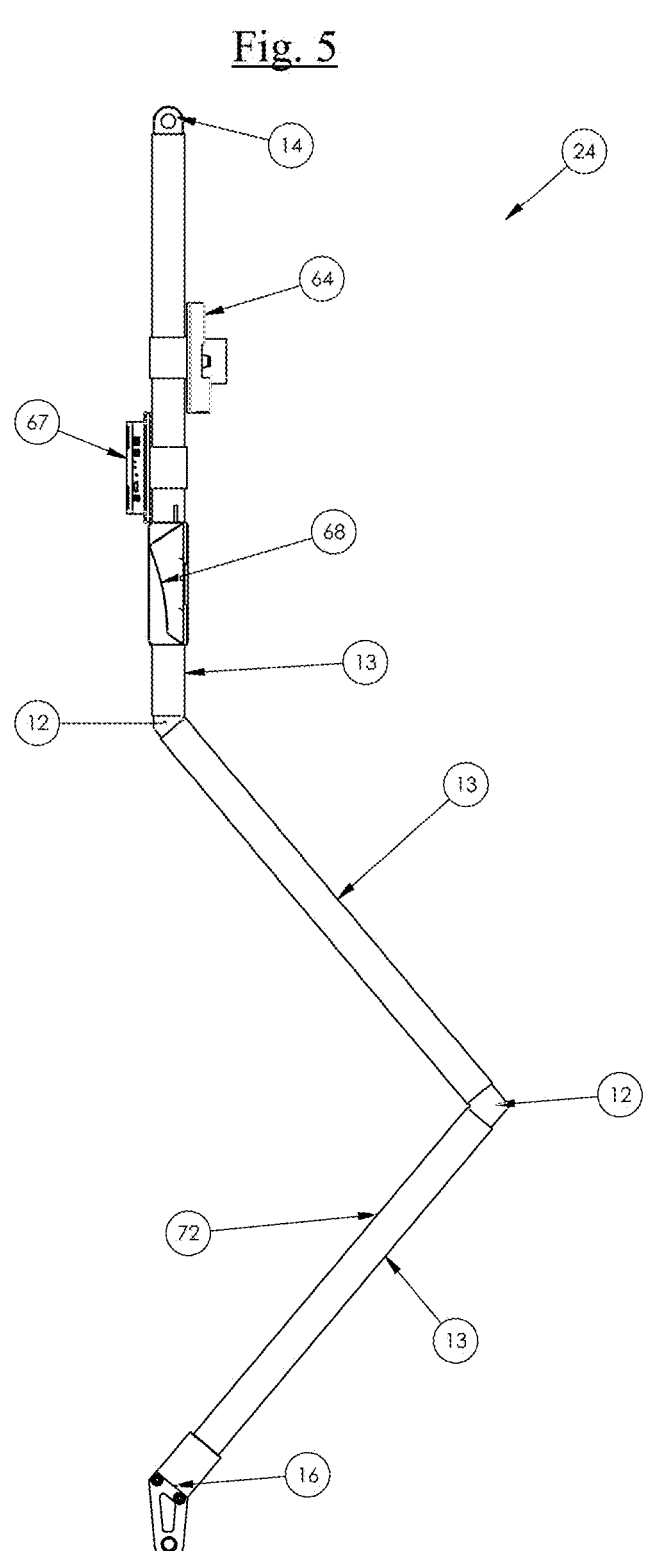
FIG. 5 is a side elevation view depicting an upright assembly of the line stringing robot of FIG. 1.

FIG. 5 shows a side view of upright assembly [24] prior to connection with thrust assembly [18]. Depicted are a plurality of elbow connectors [12], a plurality of body rods [13], end cap [14], computer [64], radio modem [67], a plurality of radio antennas [68], and central bracket [16]. In some embodiments, central bracket [16] can comprise the clevis bracket connection to thrust assembly [18] discussed above. In some embodiments, robot [7] can be suspended from unmanned aerial vehicle [5] by connection to end cap [14] via cable [80] connected to unmanned aerial vehicle [5] as shown in FIG. 1. In some embodiments, end cap [14], plurality of elbow connectors [12], and central bracket [16] can be connected by a plurality of body rods [13] to create a 100-degree angle [72] in upright assembly [24], which can provide the necessary clearance for thrust assembly [18] to pitch about its transverse axis. In some embodiments, computer [64], radio modem [67], and plurality of radio antennas [68] can be mounted to upright assembly [24] near end cap [14].

Figure 6:
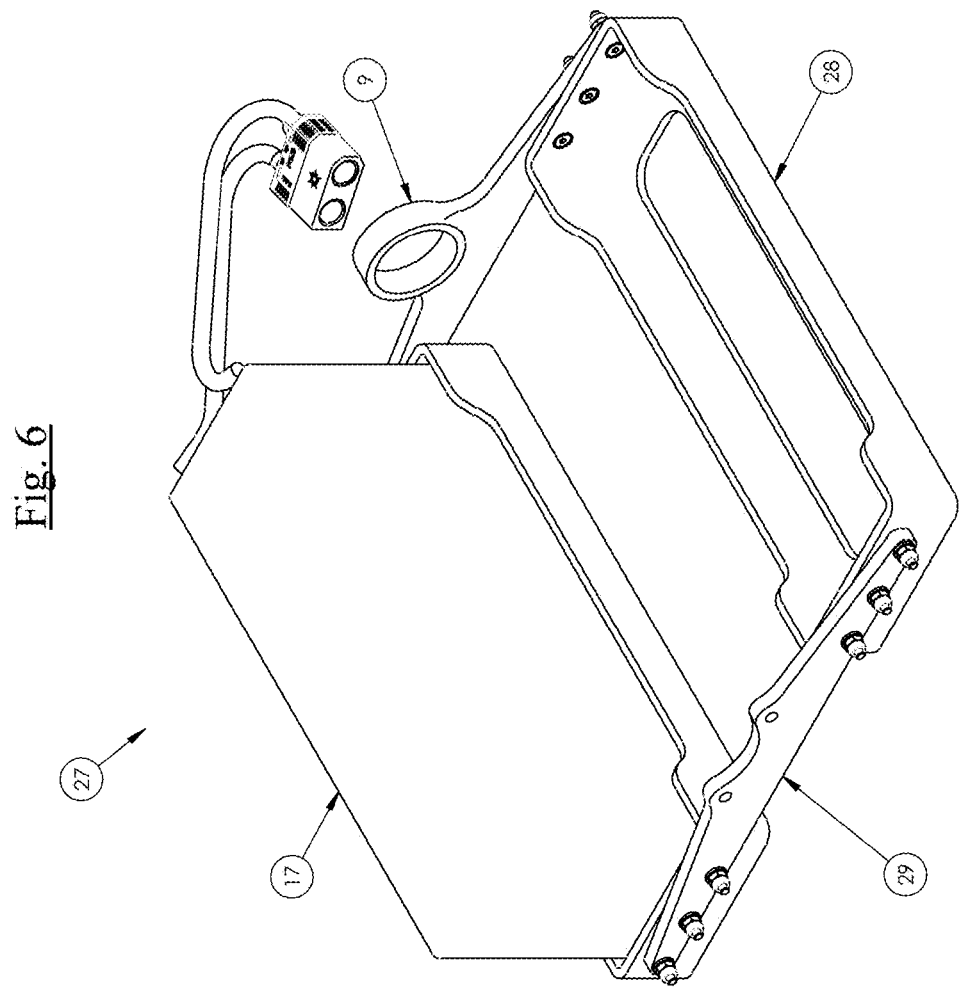
FIG. 6 is an upper perspective view depicting a battery assembly of the line stringing robot of FIG. 1.

FIG. 6 shows an upper perspective front view of battery assembly [27], prior to installation in thrust assembly [18], with one of the batteries [17] removed from the drawing for clarity. In some embodiments, battery assembly [27] can comprise of a plurality of batteries [17], a plurality of battery holders [28], tube battery plate [9], and battery plate [29]. In some embodiments, the structure of battery assembly [27] can be created by bolting tube battery plate [9] and battery plate [29] onto opposing ends of battery holders [28]. Battery assembly [27] can be retained by clamping battery plate [29] between motor mount [20] and motor [10] on thrust assembly [18]. Battery plate [9] can provide additional mounting support when central frame rod [8] of thrust assembly [18] is pressed through the circular opening of tube battery plate [9].

Figure 7:
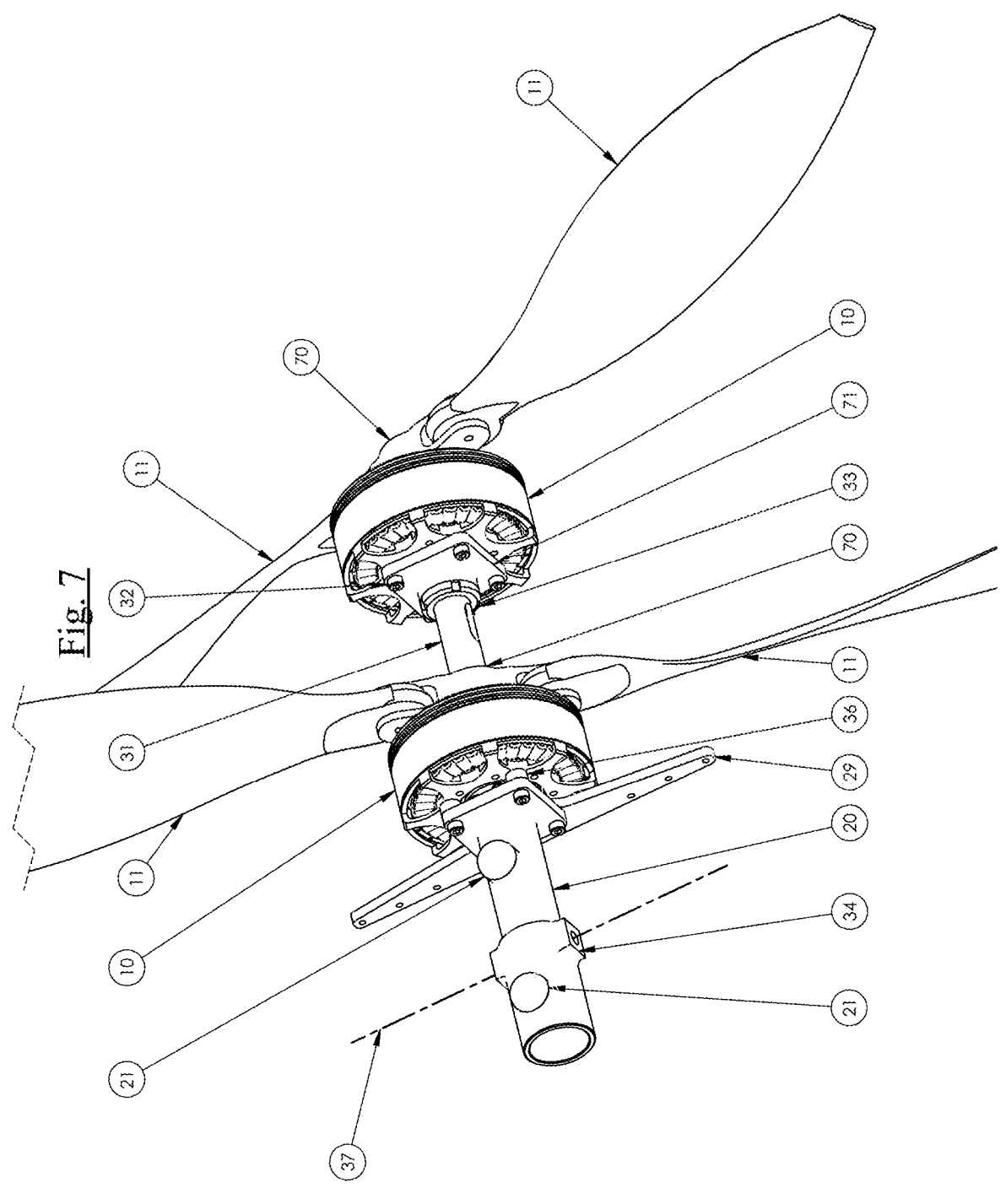
FIG. 7 is a perspective cropped view depicting a motor/propeller assembly of the line stringing robot of FIG. 1.
Figure 8:
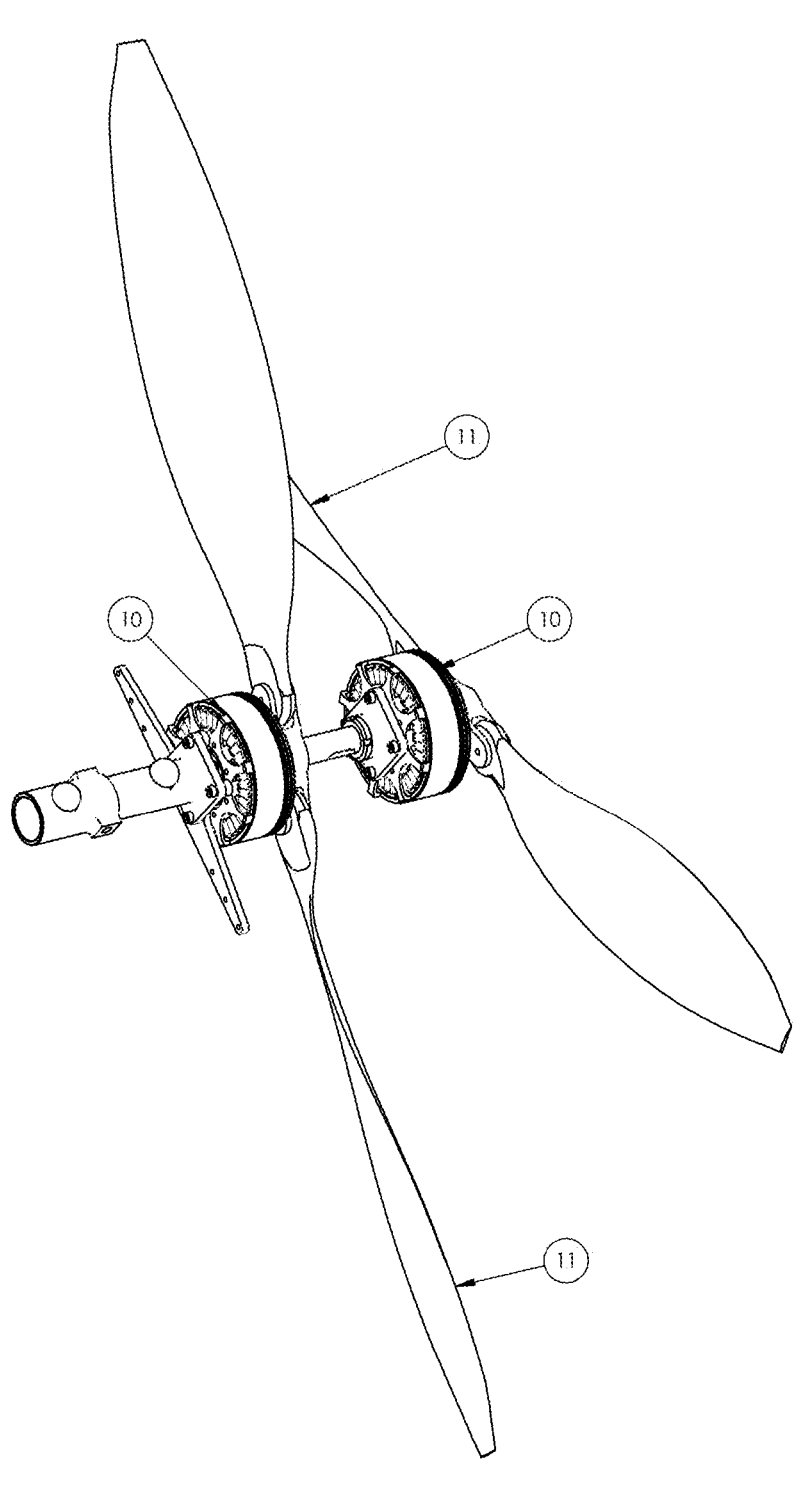
FIG. 8 is a perspective view depicting the motor/propeller assembly of FIG. 7.

FIG. 7 shows a cropped, perspective view of robot's [7] plurality of motors [10], plurality of propellers [11], and motor shaft [31] before installation on central frame rod [8]. In some embodiments, motor shaft [31] can be threaded at both ends and can screw into motor mount [20] and secondary motor mount [71]. A jam nut [33] can be used at both mounting positions to prevent rotation and subsequent unthreading of motor shaft [31]. In some embodiments, the plurality of motors [10] can be configured to counter-rotate for cancelation of the created torque effects, thereby allowing robot [7] to remain parallel to the intended direction of travel. As shown in FIG. 8, it can be seen that propellers [11] can be mounted to motors [10] such that they are mirrored images of one another. This orientation of propellers [11] can allow motors [10] to rotate in opposite directions, effectively cancelling the produced torque of each propeller [11] while still generating an aligned thrust vector. Additionally, the throttle of propellers [11] can be offset to favor one propeller [11] over another to increase torque in one direction to manipulate the orientation of robot [7] as required. Axis [37], as shown in FIG. 7, indicates the pivoting axis of thrust assembly [18] when connected to upright assembly [24], as previously described. The pivot motion can be retained by threaded-stud bumpers [21] mounted on motor mount [20] on opposing sides of axis [37]. Retaining the pivot motion can be critical to avoid collision between thrust assembly [18] and upright assembly [24]. Unthreaded spacers [36] can be used when fastening motor mount [20] to motor [10] so that battery plate [29] of equal width can clamped between them. A plurality of screws [32] can then be applied to each hole, securing unthreaded spacers [36] and battery plate [29] in position.

Figure 9:
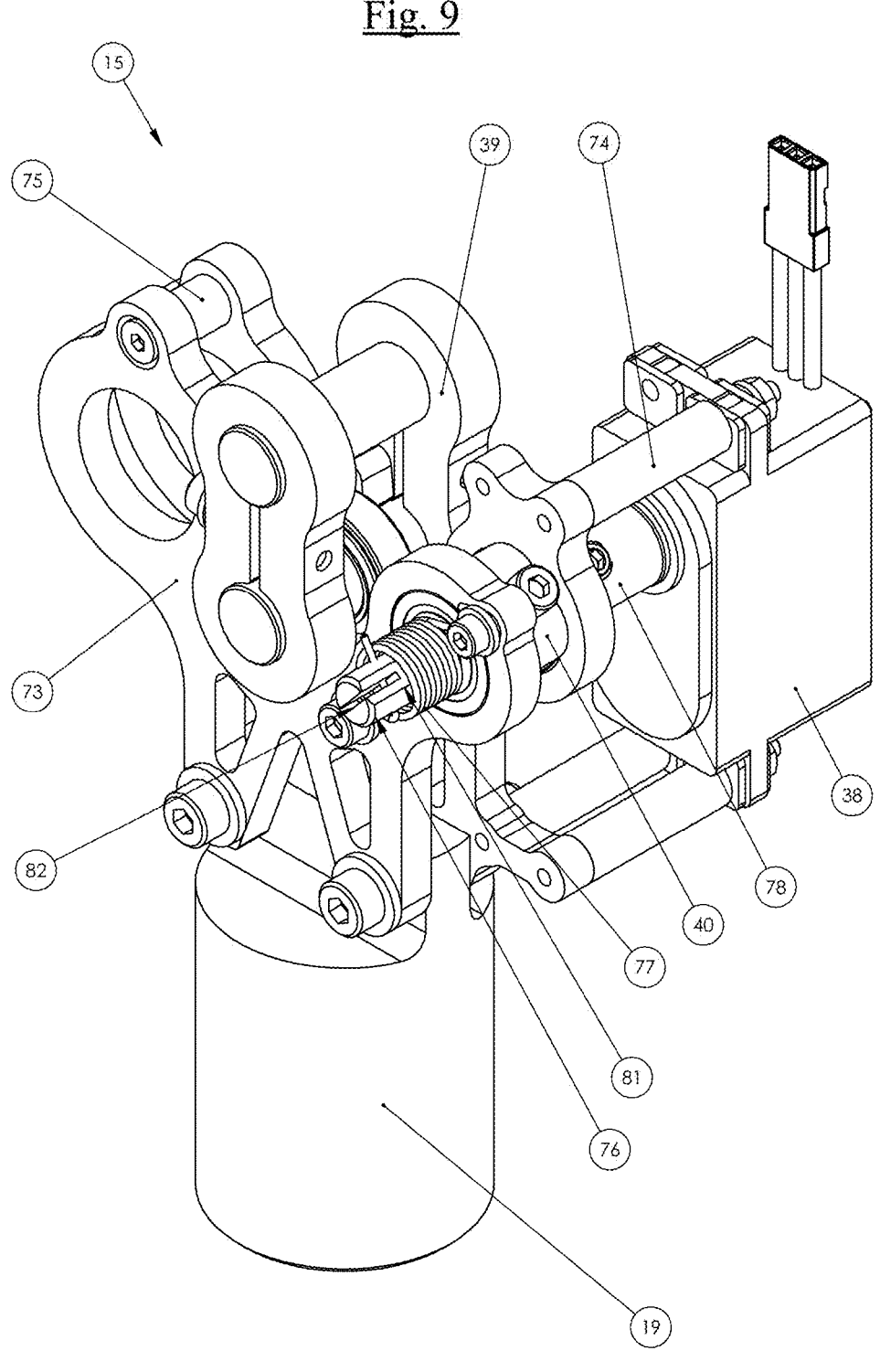
FIG. 9 is a perspective view depicting a quick release assembly of the line stringing robot of FIG. 1.

FIG. 9 shows a perspective view of quick release assembly [15] that can comprise of a plurality of main plates [73], a plurality of spacers [75], line enclosure [39], a plurality of quick release servo mounts [74], servo [38], servo adaptor [78], lock plate [40], torsion spring [77], drive shaft [76], quick release bracket [19]. In some embodiments, quick release assembly [15] can provide the connection between pilot line [4] and robot [7]; and can allow for pilot line [4] to be released from robot [7] remotely while in flight. Prior to the line stringing operation, pilot line [4] can be latched onto line enclosure [39]. The opposing end of line enclosure [39] can then be retained within quick release assembly [15] during the line stringing operation. The mechanism to retain line enclosure can comprise of servo [38] male spline engaged with servo adaptor [78] female spline, bolted to restrict axial movement. In some embodiments, drive shaft [76] can be retained at the opposing end of servo adaptor [78] by the outer diameter of drive shaft [76] and a set screw fastened against flat [81] disposed on drive shaft [76]. In some embodiments, lock plate [40] can be fitted over drive shaft [76] and radial orientation can be maintained by a set screw fastened against flat [81] on drive shaft [76]. In some embodiments, drive shaft [76] can be supported radially by two bearings pressed into main plates [73]. In some embodiments, torsion spring [77] can be bolted at one end to main plate [73] and retained at the opposing end within slot [82] disposed through the center of drive shaft [76]. In some embodiments, torsion spring [77] can act to retain line enclosure [39] if power is lost to servo [38].

Figure 11:
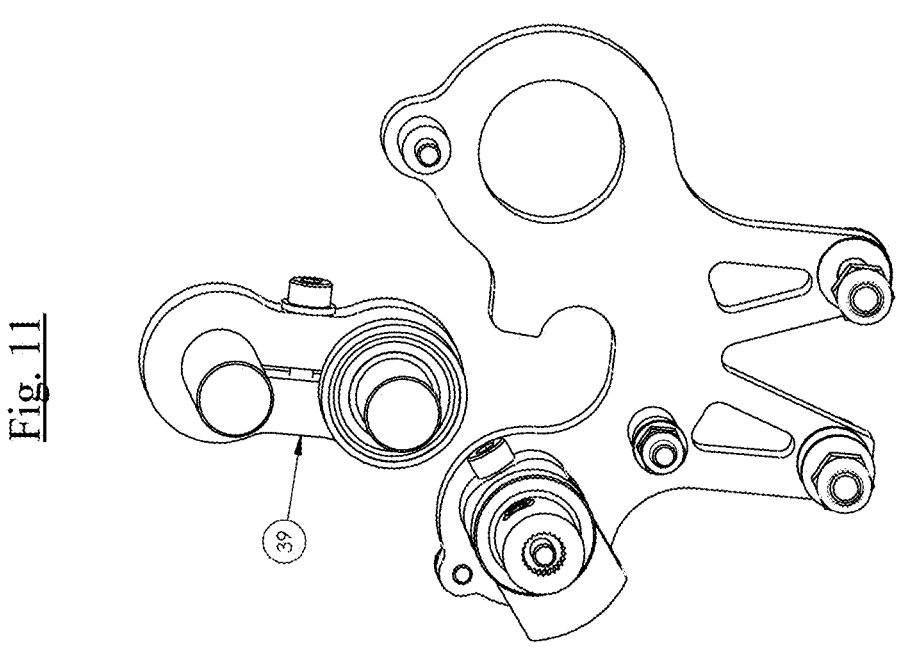
FIG. 11 is a perspective view depicting a locking mechanism of the quick release assembly of FIG. 9 in an open position.
Figure 10:
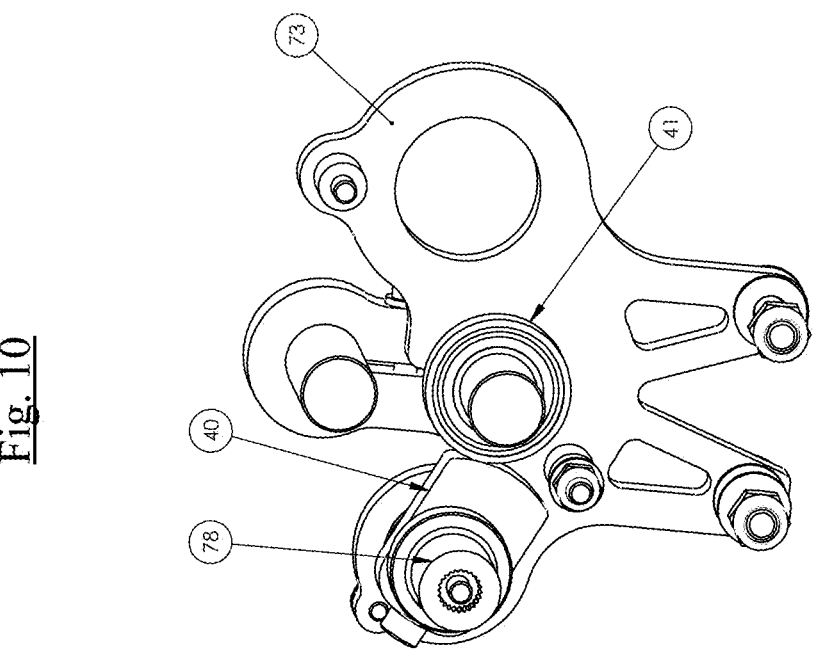
FIG. 10 is a perspective view depicting a locking mechanism of the quick release assembly of FIG. 9 in a closed position.

FIG. 10 and FIG. 11 show a side view of the locking mechanism used to retain line enclosure [39], with the plurality of servo mounts [74], servo [38], and main plate [73] removed from the drawing for clarity. FIG. 10 illustrates the closed position and FIG. 11 illustrates the open position. In some embodiments, quick release assembly [15] can operate using servo [38] to rotate lock plate [40] against bearing [41]. In a closed position, lock plate [40] can prevent lateral movement of line enclosure [39], thus preventing it and pilot line [4] from detaching from robot [7]. As shown in FIG. 11, once lock plate [40] is rotated to an open position, line enclosure [39] and pilot line [4] are no longer restrained and can be released. At this point, unmanned aerial vehicle [5] can return Robot [7] to the ground to re-establish a connection between pilot line [4] and a new line enclosure [39] to then reinstall on quick release assembly [15].

Figure 12:
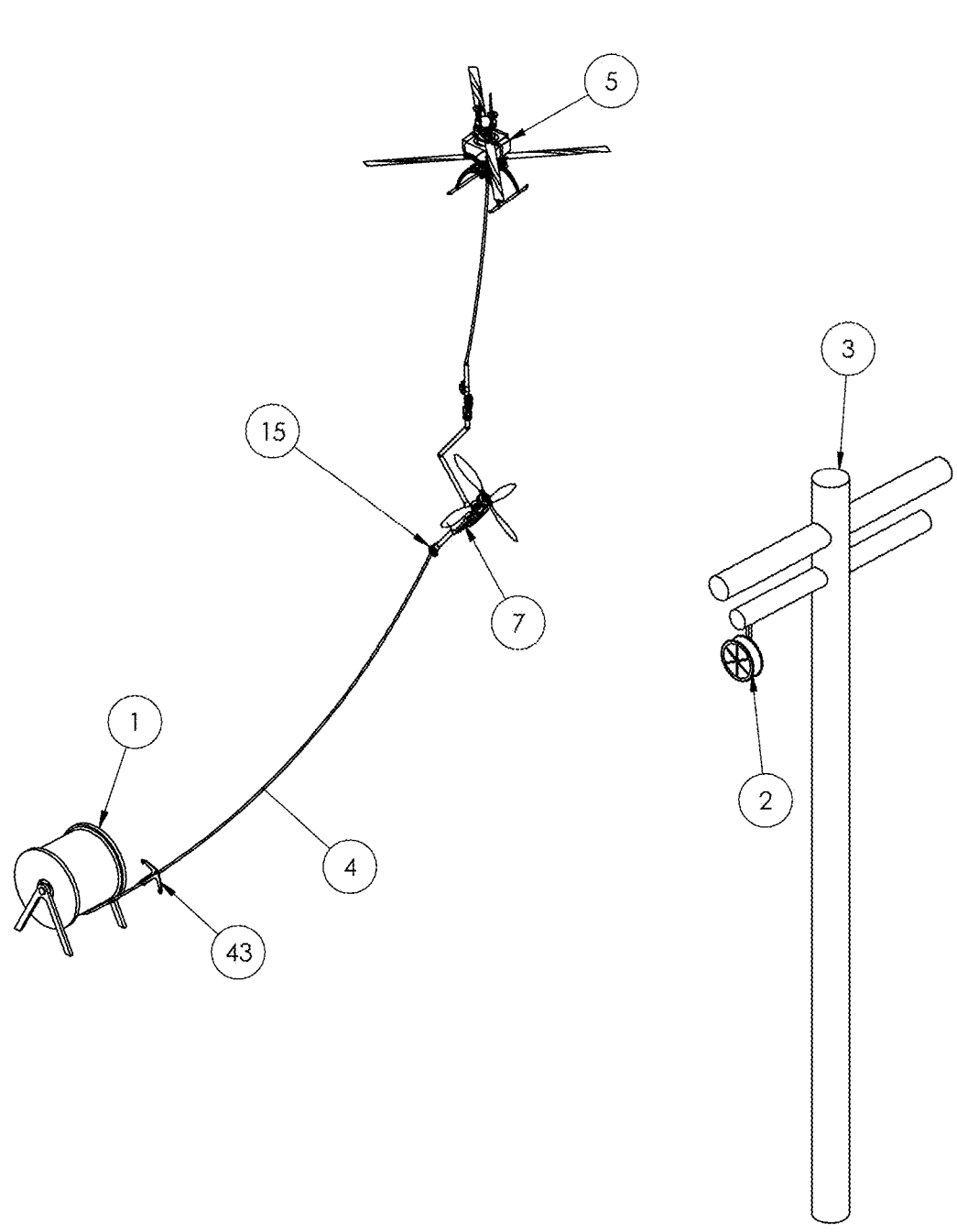
FIG. 12 is a perspective view depicting the stringing of an electric power transmission line before a pilot line is passed through the sheaves.

In some embodiments, to begin the process of line stringing, robot [7] and unmanned aerial vehicle [5] can be placed near spool [1]. Connection can be made between pilot line [4] and quick release assembly [15] as well as between robot [7] and unmanned aerial vehicle [5]. Once said connection is made, unmanned aerial vehicle [5] can lift robot [7]

towards the first of the plurality of utility poles [3] and sheave [2] combinations. Upon reaching the approximate height of the first sheave [2], a grappling hook [43] can be applied to pilot line [4] at ground level. FIG. 12 shows a perspective view of the line stringing process before pilot line [4] is passed through any of the plurality of sheaves [2]. The purpose of grappling hook [43] is shown in FIGS. 13 and 14, and upon application of grappling hook [43] to pilot line [4], the line stringing process can begin.

Figure 13:
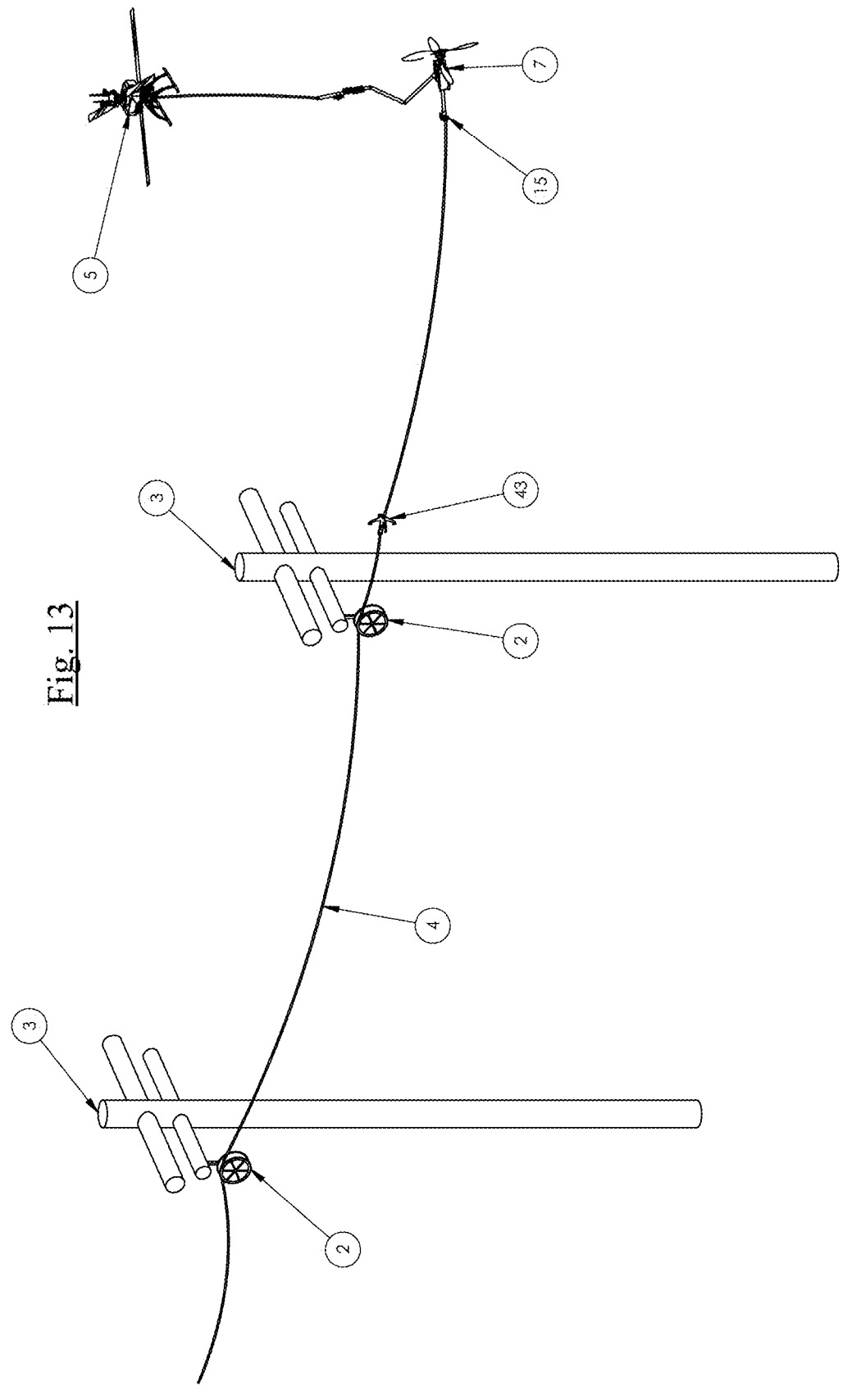
FIG. 13 is a perspective view depicting the stringing of the pilot line nearing the end of a spool's capacity of the pilot line.

FIG. 13 shows a perspective view of the line stringing process nearing the end of spool's [1] capacity of pilot line [4]. The human operator can conclude the line stringing process at a pre-determined plurality of sheaves [2]. Once this point is reached, quick release assembly [15] can be activated, ending the connection of pilot line [4] to robot [7]. The position of grappling hook [43] can determine the last sequential sheave [2] to be utilized as shown in FIG. 14.

Figure 14:
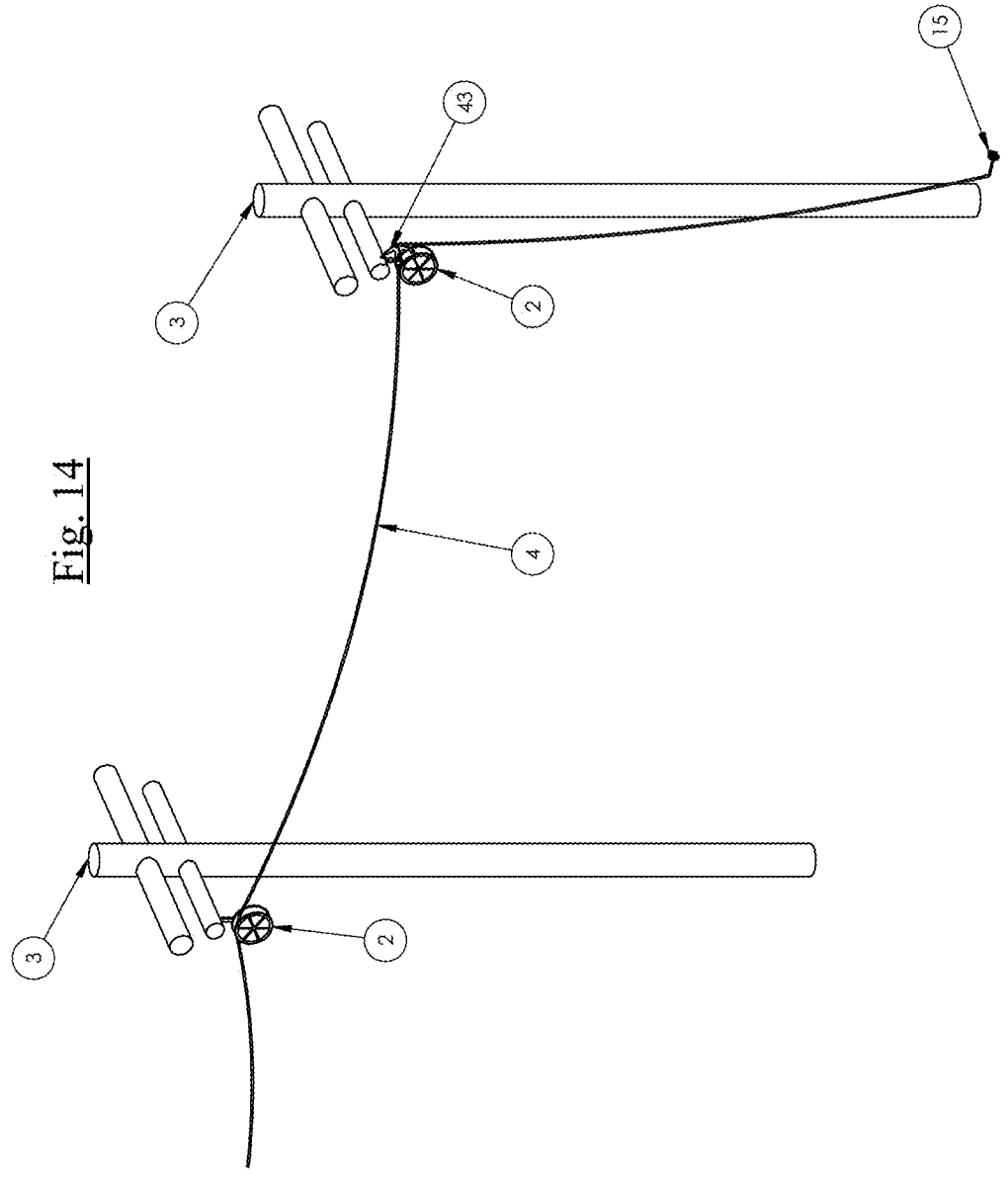
FIG. 14 is a perspective view depicting the use of a grappling hook to keep the pilot line from retracting after being released from the line stringing robot of FIG. 1.

FIG. 14 shows a perspective view of the function of grappling hook [43] after pilot line [4] disconnects from robot [7]. The weight of the previously strung pilot line [4] provides enough backwards tension to retract the pilot line [4] and grappling hook [43] back towards the last utilized sheave [2].

Figure 15:
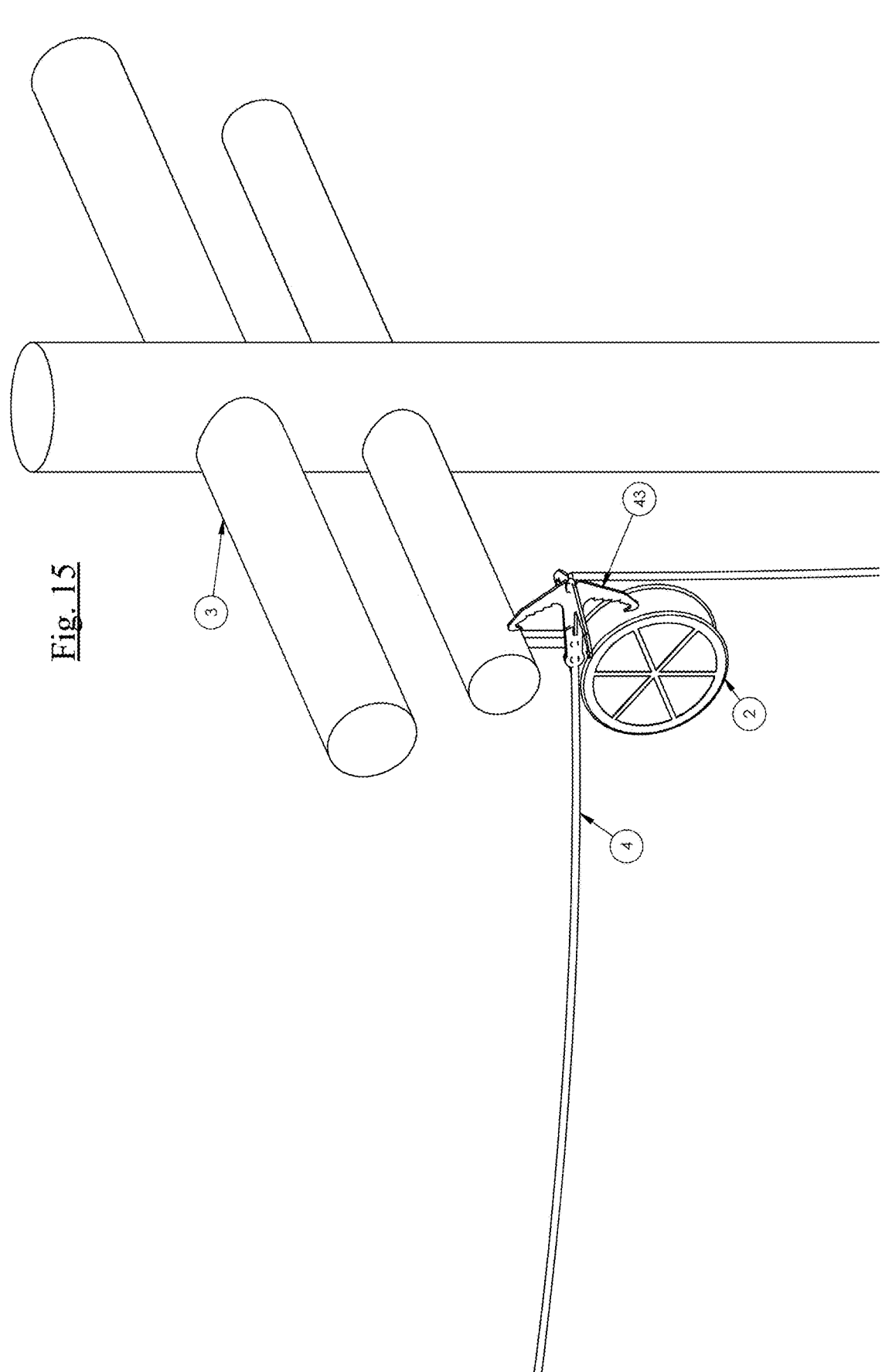
FIG. 15 is a perspective view depicting a close up view of the grappling hook of FIG. 14.

As shown in FIG. 15, grappling hook [43] can catch between sheave [2] and utility pole [3] cross beam preventing further retracting of pilot line [4]. The excess pilot line [4] on unmanned aerial vehicle [5] side of grappling hook [43] will fall to the ground allowing easy access for use known by those skilled in the art.

Figure 16:
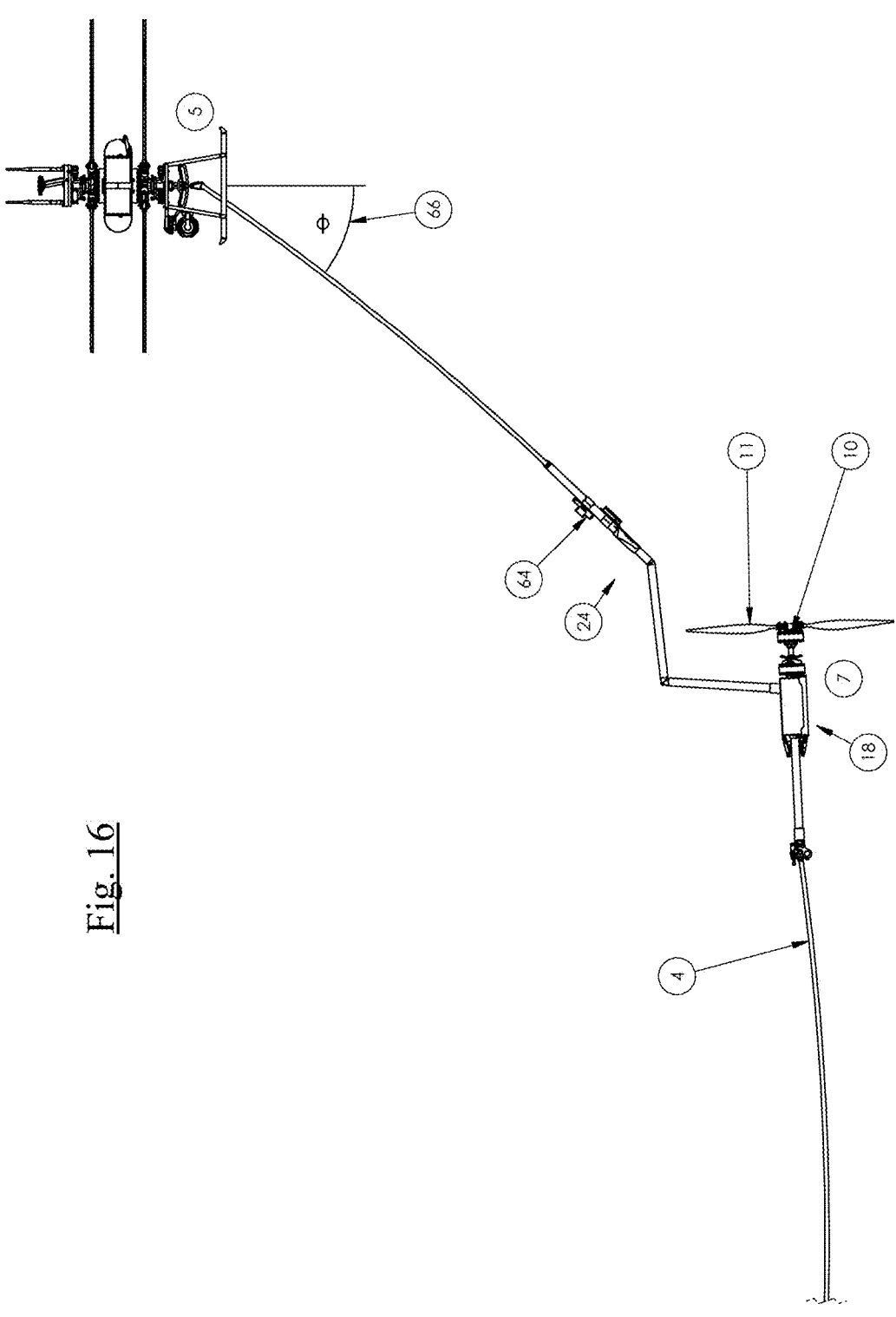
FIG. 16 is a side elevation view depicting the thrust assembly of FIG. 4 being drawn by the unmanned aerial vehicle of FIG. 1.
Figure 17:
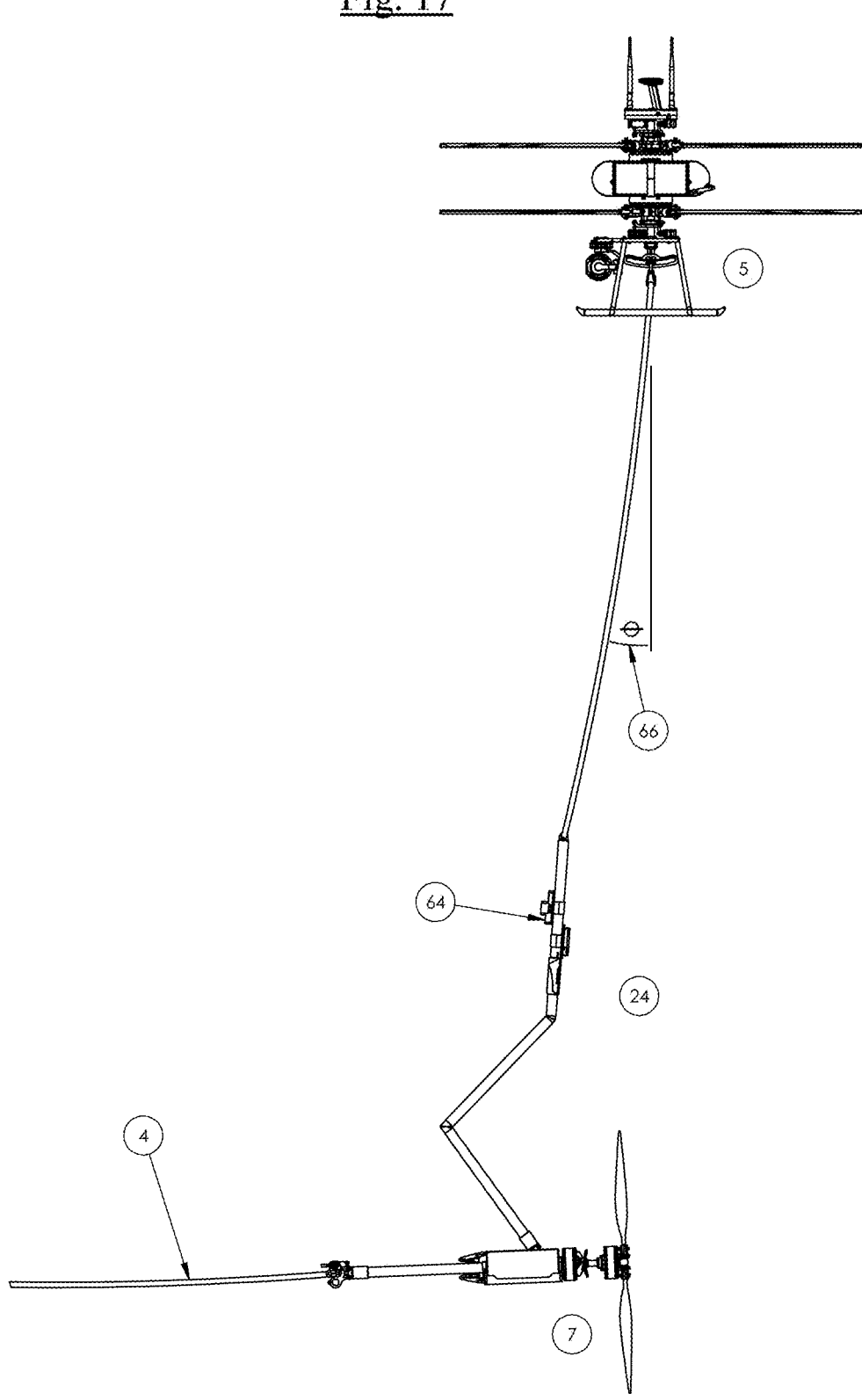
FIG. 17 is a side elevation view depicting the thrust assembly of FIG. 16 positioned beneath the unmanned aerial vehicle of FIG. 16.

FIG. 16 and FIG. 17 illustrate the throttle control on robot [7]. In some embodiments, computer [64] can be mounted to upright assembly [24] and can comprise an inertial measurement unit within computer [64] that can measure the angle of upright assembly [24] relative to vertical. As angle [66] grows, under computer's [64] command, the throttle can be increased to produce more thrust to decrease angle [66] by bringing robot [7] closer to unmanned aerial vehicle [5].

FIG. 17 shows robot [7] directly underneath unmanned aerial vehicle [5] where the angle is effectively zero. When robot [7] is substantially underneath unmanned aerial vehicle [5], computer [64] can monitor the reduction of angle [66] and then reduce the throttle to a minimum. In some embodiments, computer [64] can be configured to account for the fluctuating tension that pilot line [4] exerts on robot [7] as it dispenses. In some embodiments, computer [64] can be configured to control robot [7] to maintain its position underneath unmanned aerial vehicle [5] as effectively, and for as much time as possible, given the prevailing conditions of stringing the line and of atmospheric conditions.

Figure 18:
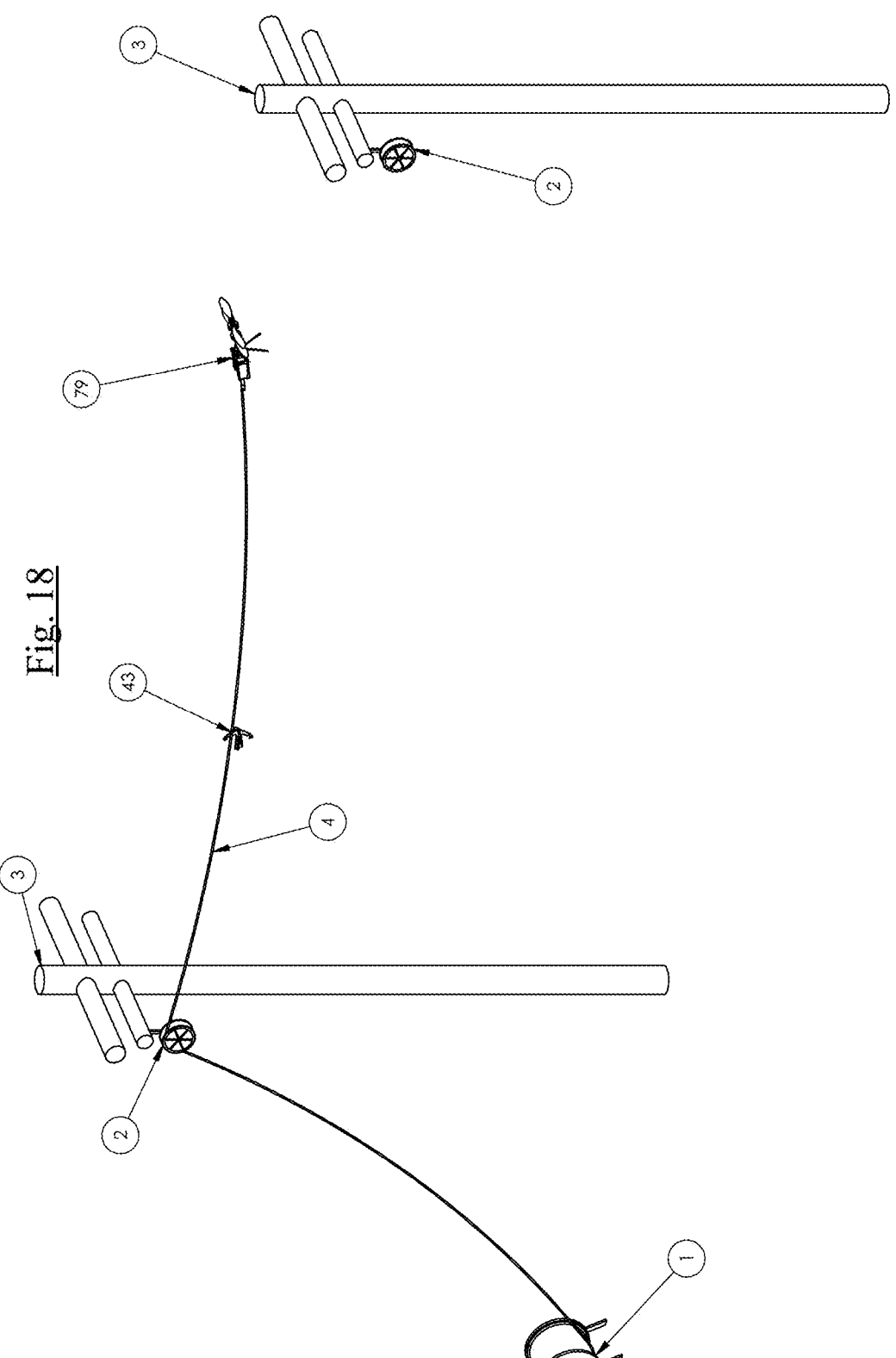
FIG. 18 is a perspective view depicting an alternate embodiment of a line stringing robot stringing an electric power transmission line.

FIG. 18 shows a perspective view of an alternate method of the line stringing process in which unmanned aerial vehicle [5] is not present or utilized. In some embodiments, aerial robot [79] can utilize a mechanism that gives enough free motion to motors [10] and propellers [11] so that the necessary vertical thrust needed to remain in the air can be provided solely by aerial robot [79].

In some embodiments, the overall process of dispensing pilot line [4] from spool [1] to be thread through a plurality of sheaves [2] on utility poles [3] is almost identical to the first embodiment described above, the only difference being is that aerial robot [79] can provide the required thrust in all axes.

Figure 19:
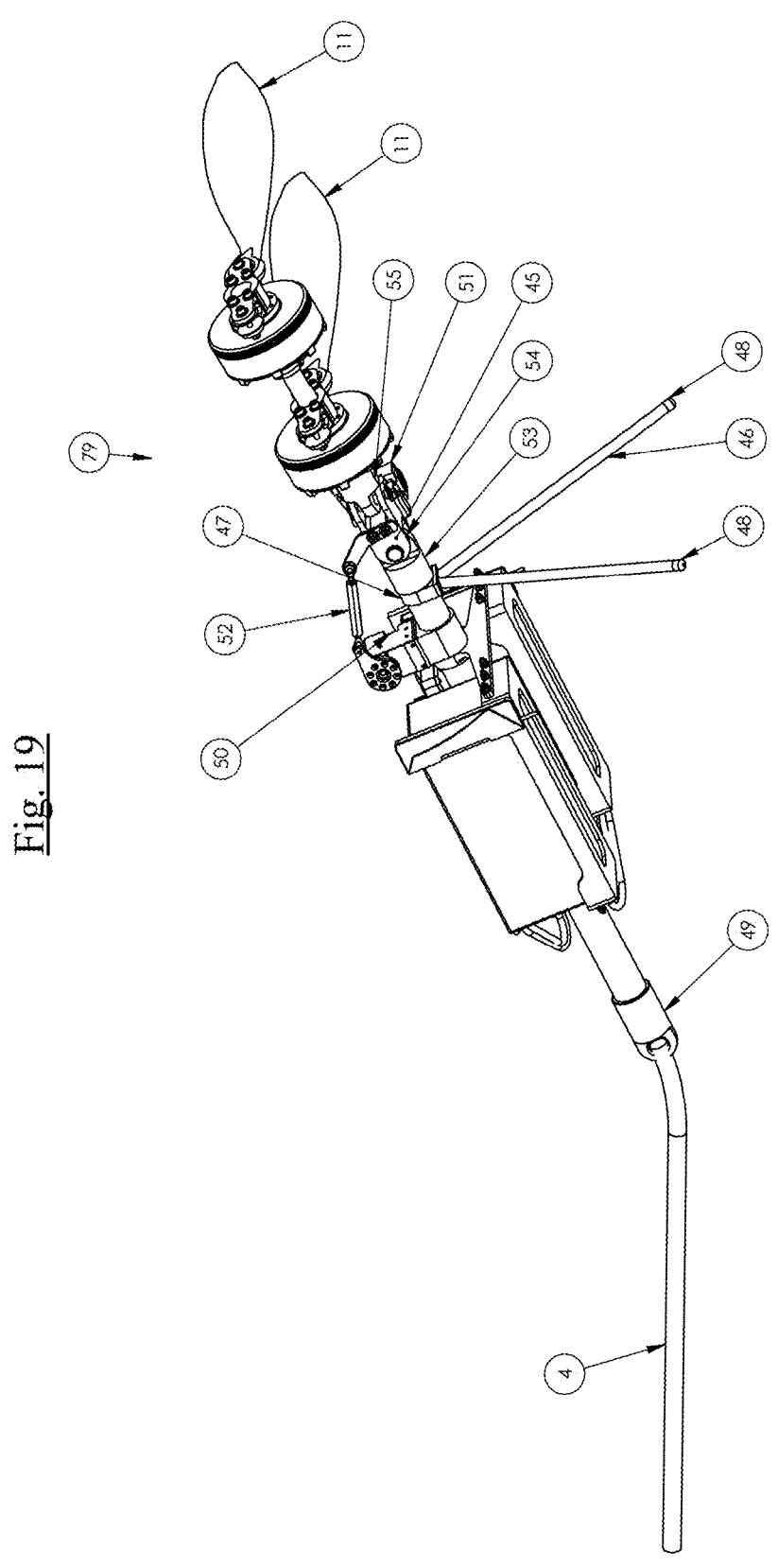
FIG. 19 is a front perspective view depicting the line stringing robot of FIG. 18.

FIG. 19 shows a perspective view of aerial robot [79] seated on the ground, armed with pilot line [4] and prepared to commence the line stringing process. In this figure, two propeller [11] blades are removed from the drawing for clarity. Shown in FIG. 19, aerial robot [79] is shown in a take-off position, which can be done in a kite-like fashion using the tension from pilot line [4] and thrust vectoring mechanism [45] for stability in all directions. Rope end cap [49] and plastic stoppers [48] can slide along the ground until sufficient thrust is generated by propellers [11] to lift aerial robot [79] off the ground. In some embodiments, thrust vectoring mechanism [45] can comprise three main components that can be controlled using vertical control servo [50] and horizontal control servo [51]. In some embodiments, these components can comprise central rod mount [53], dual motion bracket [54], and rotational motor mount [55], whose function is explained below, and shown in FIGS. 20 and 21.

Figure 20:
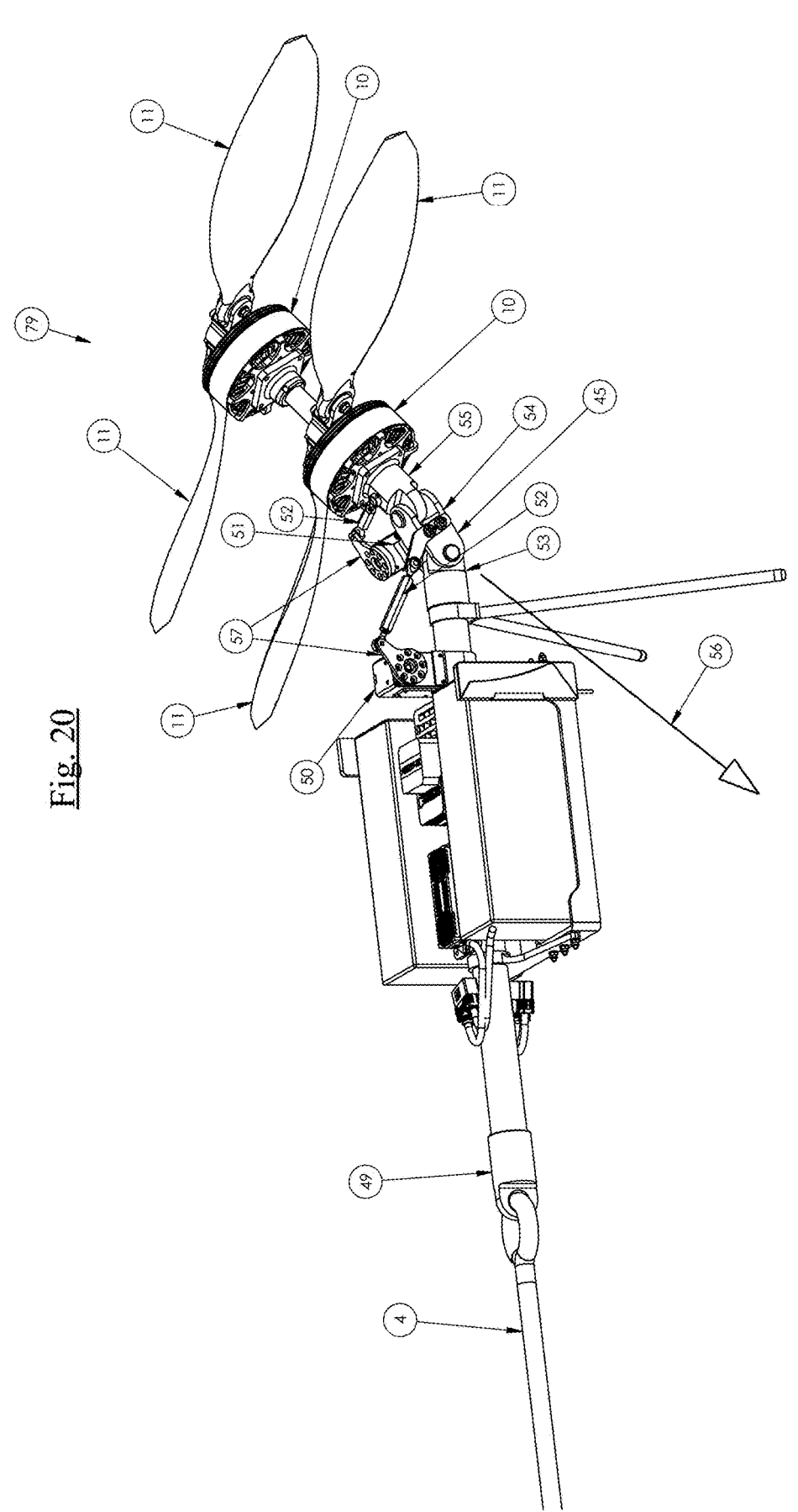
FIG. 20 is a side perspective view depicting the line stringing robot of FIG. 19.

FIG. 20 shows a perspective view of aerial robot [79] with thrust vector [56] placed in a specific orientation which is a result of thrust vectoring mechanism [45] activating. Within this mechanism, there can be disposed vertical control servo [50] connected to dual motion bracket [54], and horizontal control servo [51] connected to rotational motor mount [55], both through linkage [52]. In some embodiments, vertical control servo [50] can spin its corresponding servo arm [57], either lifting or lowering dual motion bracket [54] and all the components following it. This, in turn, can raise or lower thrust vector [56] to thereby provide variable vertical support. Similarly, horizontal control servo [51] can spin its corresponding servo arm [57], shifting rotational motor mount [55] and all following components left or right, thereby giving horizontal motion to thrust vector [56]. In some embodiments, counter rotating propellers [11] can be programmed to rotate at a specific frequency such that the produced torque therefrom can keep Aerial Robot [79] upright and in the correct orientation. This embodiment can ensure that all degrees of freedom and motion are covered whereby aerial robot [79] can have full control over its motion. In some embodiments, rope end cap [49] can be used to retain pilot line [4] as the applied tension of pilot line [4] applied tension is necessary for the controlled flight of aerial robot [79].

Figure 21:
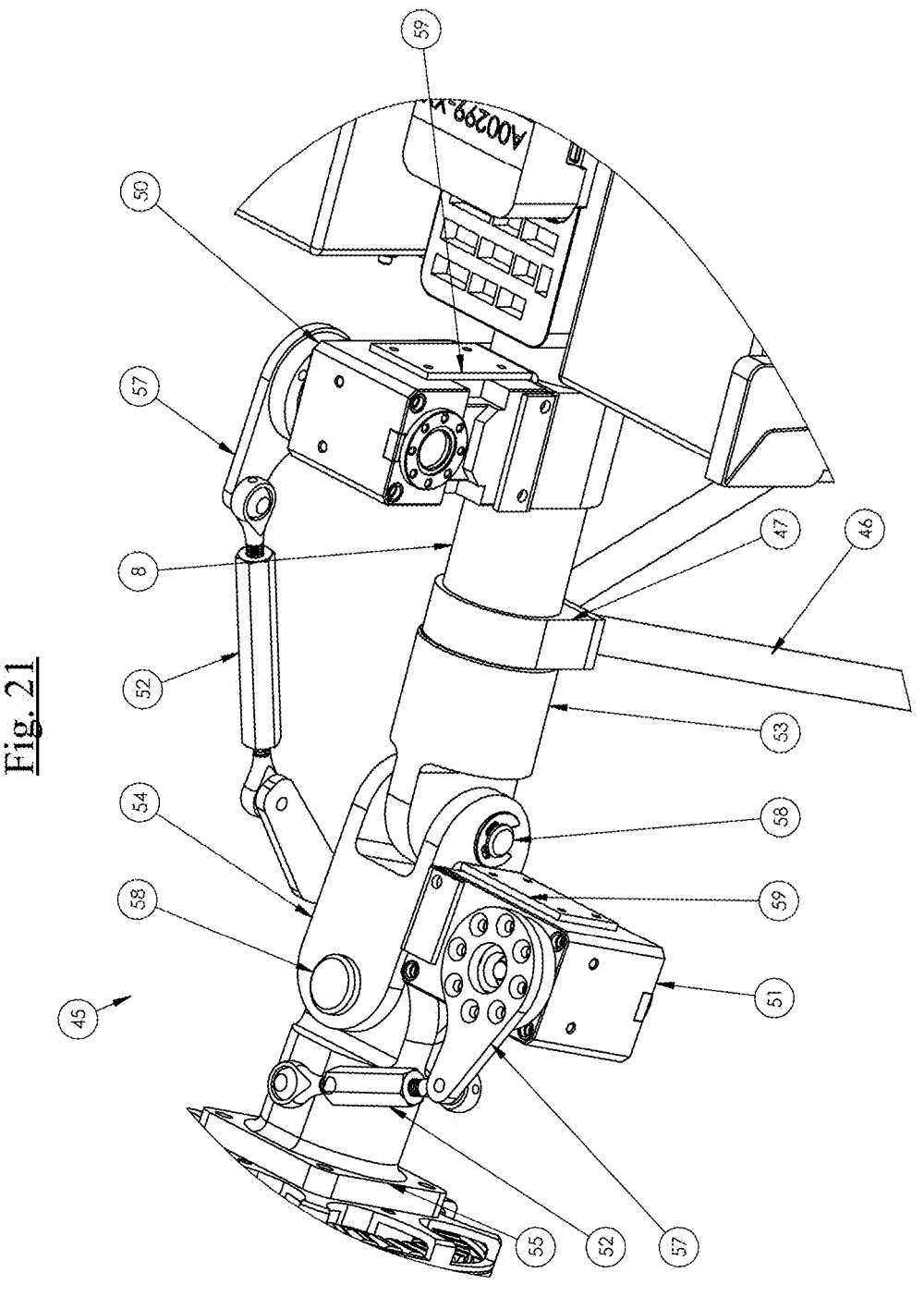
FIG. 21 is a perspective view depicting a thrust vectoring mechanism of the line stringing robot of FIG. 20.

FIG. 21 shows a close-up perspective view of thrust vectoring mechanism [45] and how all corresponding connections are utilized to provide controlled, but free movement in all axes. In some embodiments, pins [58] can provide a rigid link between central rod mount [53] and dual motion bracket [54], and between dual motion bracket [54] and rotational motor mount [55] while allowing one degree of rotation at each connection; vertical for one, and horizontal for the other. In some embodiments, vertical control servo [50] can be mounted directly to central frame rod [8] through servo mount [59], and horizontal control servo [51] can be mounted to dual motion bracket [54] through servo mount [59]. In some embodiments, landing gear [46] can bolt directly into landing gear bracket [47], which can be installed on central frame rod [8] and can be utilized in takeoff and landing procedures. In some embodiments, landing gear [46] can be placed in front of the centre of mass so that rope end cap [49] can rest on the ground during takeoff and landing to provide three points of contact for maximum stability. Upon landing, a human operator can release the connection of pilot line [4] from rope end cap [49] for use for purposes known by those skilled in the art.

Figure 22:
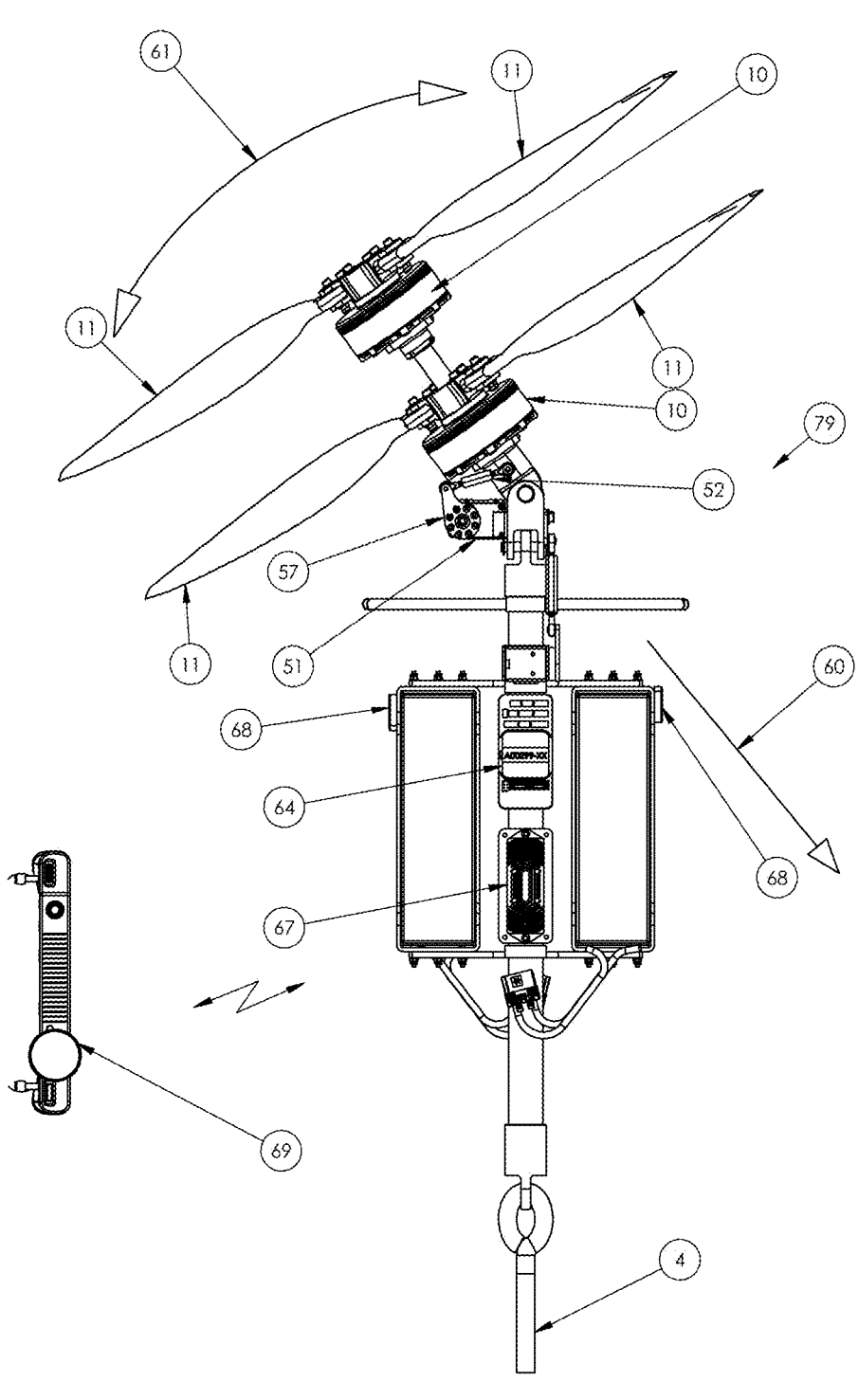
FIG. 22 is a top plan view depicting the line stringing robot of FIG. 19.

FIG. 22 shows a top-down view of aerial robot [79], illustrating the function of horizontal control servo [51] and the resulting motion of horizontal thrust vector [60]. In some embodiments, horizontal control servo [51] can rotate servo arm [57] thus pushing servo linkage [52] side to side depending on the direction of rotation. This rotation can create motion in motors [10] and propellers [11], illustrated by horizontal arrow [61], which consequently rotates horizontal thrust vector [60]. In some embodiments, to operate aerial robot [79], the human operator can use ground station [69] to send radio signals to one or more radio antennas [68], which are connected to radio modem [67]. Radio modem [67] can then decode the radio signals from ground station [69] and send these signals to computer [64] that, in turn, can send the signals to the electrical equipment fitted to aerial robot [79], for example, electrically driven motors and servo actuators configured to cause aerial robot [79] to operate and complete its task of line stringing. In some embodiments, computer [64] can be programmed to operate aerial robot [79] automatically without operator input, or semi-automatically by taking cues from the human operator via ground station [69], as desired.

Figure 23:
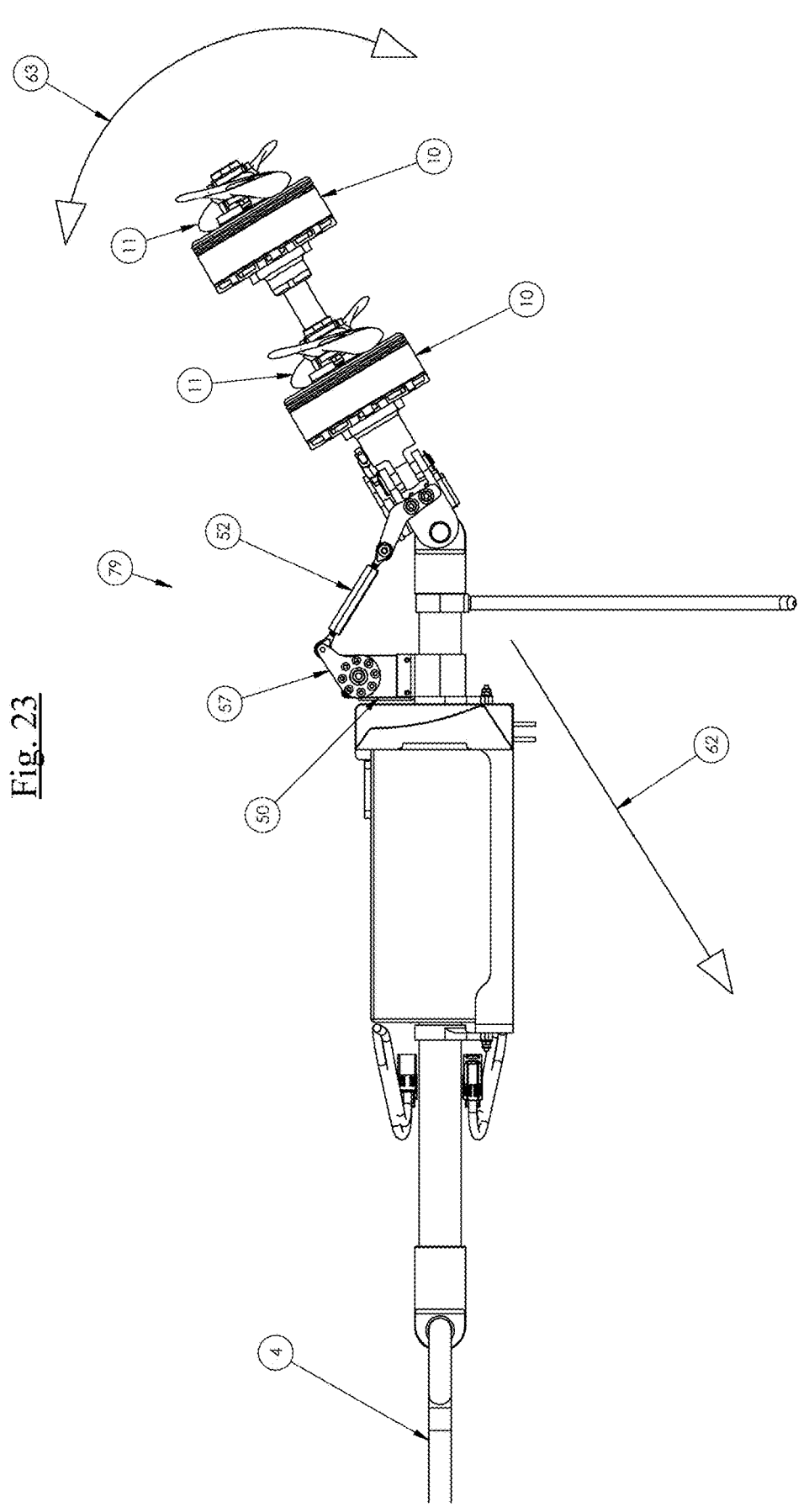
FIG. 23 is a side elevation view depicting the line stringing robot of FIG. 20.

Similarly, as shown in FIG. 23, the function of vertical control servo [50] and resulting action of vertical thrust vector [62] is outlined. In some embodiments, vertical control servo [50] can rotate the attached servo arm [57] that can slide servo linkage [52] forwards or backwards resulting in the raising or lowering of motors [10] and propellers [11], as outlined by vertical arrow [63]. The motion described by vertical arrow [63] can cause vertical thrust vector [62] to rise or fall.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the embodiments described herein.

Embodiments implemented in computer software can be implemented in software, firmware, middleware, microcode, hardware description languages, or any combination thereof. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted via any suitable means including memory sharing, message passing, token passing, network transmission, etc.

The actual software code or specialized control hardware used to implement these systems and methods is not limiting of the embodiments described herein. Thus, the operation and behavior of the systems and methods were described without reference to the specific software code being understood that software and control hardware can be designed to implement the systems and methods based on the description herein.

When implemented in software, the functions can be stored as one or more instructions or code on a non-transitory computer-readable or processor-readable storage medium. The steps of a method or algorithm disclosed herein can be embodied in a processor-executable software module, which can reside on a computer-readable or processor-readable storage medium. A non-transitory computer-readable or processor-readable media includes both computer storage media and tangible storage media that facilitate transfer of a computer program from one place to another. A non-transitory processor-readable storage media can be any available media that can be accessed by a computer. By way of example, and not limitation, such non-transitory processor-readable media can comprise RAM, ROM, EEPROM, CD-ROM or other optical disk storage, magnetic disk storage or other magnetic storage devices, or any other tangible storage medium that can be used to store desired program code in the form of instructions or data structures and that can be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and/or instructions on a non-transitory processor-readable medium and/or computer-readable medium, which can be incorporated into a computer program product.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A system for stringing a span of cable, the system comprising a robotic aerial assembly for pulling the cable, wherein the robotic aerial assembly comprises:
  a) an aerial thrust assembly, comprising:
    i) a central frame rod having a first end and second end,
    ii) at least one electric motor disposed on the first end, the at least one electric motor operatively coupled to a propeller,
    iii) a quick release assembly disposed on the second end, the quick release assembly configured for releasable coupling to the cable, and
    iv) a battery assembly disposed on the central frame rod, the battery assembly operatively coupled to the at least one electric motor; and
  b) an unmanned aerial vehicle ("UAV") for suspending the aerial thrust assembly above a ground surface.

2. The system as set forth in claim 1, further comprising:
  a) a computer operatively coupled to the at least one electric motor, the computer operatively powered by the battery assembly;
  b) a radio modem operatively coupled to the computer, the radio modem operatively powered by the battery assembly; and
  c) at least one radio antenna operatively coupled to the radio modem.

3. The system as set forth in claim 2, further comprising a ground station wireless transceiver for transmitting and receiving signals to and from the radio modem.

4. The system as set forth in claim 2, further comprising an upright assembly operatively coupled to the aerial thrust assembly, the upright assembly configured for coupling to the UAV, wherein the computer, the radio modem and the at least one radio antenna are disposed on the upright assembly.

5. The system as set forth in claim 1, wherein the battery assembly comprises:
  a) a battery plate operatively coupled to the central frame rod; and
  b) one or more batteries disposed on the battery plate.

6. The system as set forth in claim 1, wherein the at least one electric motor comprises two electric motors with propellers attached thereto, the two electric motors configured to rotate in opposite directions to each other.

7. The system as set forth in claim 1, wherein the robotic aerial assembly comprises:
  a) a central frame rod having a first end and second end;
  b) at least one electric motor disposed on the first end, the at least one electric motor operatively coupled to a propeller, the at least one electric motor rotatably coupled to the central frame rod;
  c) a quick release assembly disposed on the second end, the quick release assembly configured for releasable coupling to the cable; and
  d) a battery assembly disposed on the central frame rod, the battery assembly operatively coupled to the at least one electric motor.

8. The system as set forth in claim 7, further comprising:
  a) a first control servo mechanism for rotating the at least one electric motor vertically up and down relative to the central frame rod; and
  b) a second control servo mechanism for rotating the at least one electric motor horizontally side-to-side relative to the central frame rod.

9. The system as set forth in claim 7, further comprising:
  a) a computer operatively coupled to the at least one electric motor, the computer operatively powered by the battery assembly;
  b) a radio modem operatively coupled to the computer, the radio modem operatively powered by the battery assembly; and
  c) at least one radio antenna operatively coupled to the radio modem.

10. The system as set forth in claim 9, further comprising a ground station wireless transceiver for transmitting and receiving signals to and from the radio modem.

11. The system as set forth in claim 7, wherein the battery assembly comprises:
  a) a battery plate operatively coupled to the central frame rod; and
  b) one or more batteries disposed on the battery plate.

12. The system as set forth in claim 7, wherein the at least one electric motor comprises two electric motors with propellers attached thereto, the two electric motors configured to rotate in opposite directions to each other.

13. A method for stringing a span of cable disposed on a spool over a plurality of utility poles, each utility pole comprising a cable sheave disposed thereon, the method comprising:
  a) attaching the cable to a robotic aerial assembly;
  b) operating the robotic aerial assembly to raise the cable, thereby dispensing the cable from the spool, to bring the cable near the cable sheave of a first of the plurality of utility poles;
  c) attaching a grappling hook to a portion of the cable near the spool; and d) operating the robotic aerial assembly further to pull the cable onto the sheaves of one or more of the plurality of the utility poles.

14. The method as set forth in claim 13, further comprising:

a) passing the grappling hook over the sheave over a last of the plurality of the utility poles; and b) releasing the cable from the robotic aerial assembly whereby the grappling hook catches on the sheave of the last of the plurality of utility poles to keep the cable in place.

15. The method as set forth in claim 13, wherein the robotic aerial assembly comprises:

a) a central frame rod having a first end and second end;

b) at least one electric motor disposed on the first end, the at least one electric motor operatively coupled to a propeller, the at least one electric motor rotatably coupled to the central frame rod;

c) a quick release assembly disposed on the second end, the quick release assembly configured for releasable coupling to the cable; and d) a battery assembly disposed on the central frame rod, the battery assembly operatively coupled to the at least one electric motor.

16. The method as set forth in claim 15, wherein the robotic aerial assembly further comprises:

a) a computer operatively coupled to the at least one electric motor, the computer operatively powered by the battery assembly;

b) a radio modem operatively coupled to the computer, the radio modem operatively powered by the battery assembly; and c) at least one radio antenna operatively coupled to the radio modem.

17. The method as set forth in claim 16, further comprising using a ground station wireless transceiver for transmitting and receiving signals to and from the radio modem.

18. The method as set forth in claim 17, wherein the battery assembly comprises:

a) a battery plate operatively coupled to the central frame rod; and b) one or more batteries disposed on the battery plate.

19. The method as set forth in claim 15, wherein the at least one electric motor comprises two electric motors with propellers attached thereto, the two electric motors configured to rotate in opposite directions to each other.

* * * * *